US011267524B2

(12) United States Patent
Maguire

(10) Patent No.: US 11,267,524 B2
(45) Date of Patent: Mar. 8, 2022

(54) CYCLE ACCESSORY MOUNTING SYSTEM AND ATTACHMENT DEVICE

(71) Applicant: AEROE SPORTS LIMITED, Dunedin (NZ)

(72) Inventor: Patrick David Maguire, Nelson (NZ)

(73) Assignee: AEROE SPORTS LIMITED, Dunedin (NZ)

( * ) Notice: Subject to any disclaimer, the term of this patent is extended or adjusted under 35 U.S.C. 154(b) by 0 days.

(21) Appl. No.: 17/170,090

(22) Filed: Feb. 8, 2021

(65) Prior Publication Data

US 2021/0179219 A1 Jun. 17, 2021

Related U.S. Application Data

(63) Continuation of application No. 16/979,723, filed as application No. PCT/NZ2019/050027 on Mar. 15, 2019, now Pat. No. 10,953,943.

(30) Foreign Application Priority Data

Mar. 16, 2018 (NZ) ........................................ 740794

(51) Int. Cl.
*B62J 7/04* (2006.01)
*B62J 9/27* (2020.01)
(Continued)

(52) U.S. Cl.
CPC . *B62J 7/04* (2013.01); *B62J 7/06* (2013.01); *B62J 7/08* (2013.01); *B62J 9/21* (2020.02);
(Continued)

(58) Field of Classification Search
CPC ......... B62J 7/04; B62J 7/06; B62J 7/08; B62J 9/23; B62J 9/27; B62J 9/21; B62J 9/26; B62J 9/30
See application file for complete search history.

(56) References Cited

U.S. PATENT DOCUMENTS 2,604,098 A 7/1952 Kranc
3,853,253 A 12/1974 Hawkins et al.
(Continued)

FOREIGN PATENT DOCUMENTS

DE 10 2011 106267 A1 11/2012
DE 10 2015 016724 A1 6/2017

OTHER PUBLICATIONS

International Searching Authority, International Search Report and Written Opinion for International Application No. PCT/NZ2019/050027, dated Jun. 6, 2019, (17 pages), Australian Patent Office, Woden ACT, Australia.
(Continued)

*Primary Examiner* — Corey N Skurdal
(74) *Attorney, Agent, or Firm* — Alston & Bird LLP

(57) ABSTRACT

A system for mounting an accessory to a cycle has a mounting part 400, a receiving part 500, and a locking member 508. The mounting part 400 has an axially extending member 402 and at least one transversely projecting lug 406. The receiving part 500 has a recess for receiving the member 402 and the lug(s) 406 when the receiving part 500 is in a receiving/releasing position, and at least one lip 506 for engaging with the lug(s) 406 to retain the mounting part 400 when the receiving part 500 is angularly moved relative to the mounting part 400. The locking member 508 is operable between the mounting part 400 and the receiving part 500, and is moveable between an unlocked position and a securing position to selectively retain the receiving part 500 in a plurality of angularly offset locked positions relative to the mounting part 400.

14 Claims, 32 Drawing Sheets

(51) Int. Cl.
*B62J 9/21* (2020.01)
*B62J 9/26* (2020.01)
*B62J 9/30* (2020.01)
*B62J 7/06* (2006.01)
*B62J 7/08* (2006.01)
*B62J 9/23* (2020.01)

(52) U.S. Cl.
CPC . *B62J 9/23* (2020.02); *B62J 9/26* (2020.02); *B62J 9/27* (2020.02); *B62J 9/30* (2020.02)

(56) References Cited

U.S. PATENT DOCUMENTS

| | | |
|---|---|---|
| 4,402,439 A | 9/1983 | Brown |
| 4,542,839 A | 9/1985 | Levine et al. |
| 4,682,426 A * | 7/1987 | De Marchi ........ A43C 11/1413 24/68 CD |
| 5,152,489 A | 10/1992 | Christensen et al. |
| 5,190,345 A | 3/1993 | Lin |
| 6,322,279 B1 * | 11/2001 | Yamamoto ............. B60R 9/045 224/324 |
| 6,507,980 B2 * | 1/2003 | Bremicker ............... B62J 11/00 24/269 |
| 8,662,362 B1 | 3/2014 | Bastian et al. |
| 8,870,138 B2 * | 10/2014 | Maguire .................. B62J 11/00 248/230.8 |
| 9,243,739 B2 | 1/2016 | Peters |
| D869,163 S | 12/2019 | Maguire |
| 10,760,732 B1 | 9/2020 | Koh et al. |
| 2005/0035166 A1 | 2/2005 | Kresge |
| 2010/0327132 A1 | 12/2010 | Maguire |
| 2014/0360893 A1 | 12/2014 | Whitten et al. |
| 2015/0165596 A1 * | 6/2015 | Andersen ................ F41H 11/05 24/68 BT |
| 2015/0210334 A1 | 7/2015 | Armstrong et al. |
| 2016/0212869 A1 | 7/2016 | Gutschenritter et al. |
| 2019/0154190 A1 | 5/2019 | Yun |
| 2021/0024158 A1 | 1/2021 | Maguire |

OTHER PUBLICATIONS

Notice of Allowance and Fee(s) Due for U.S. Appl. No. 16/979,723, filed Jan. 6, 2021, (7 pages), United States Patent and Trademark Office, USA.

* cited by examiner

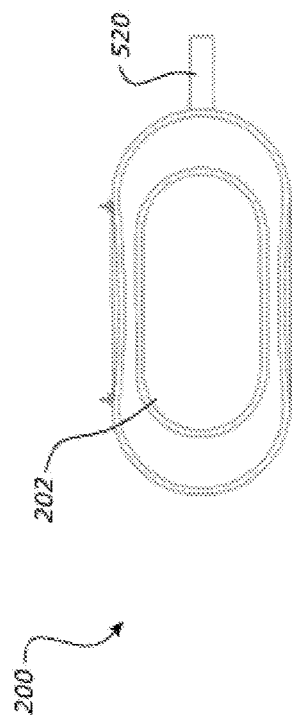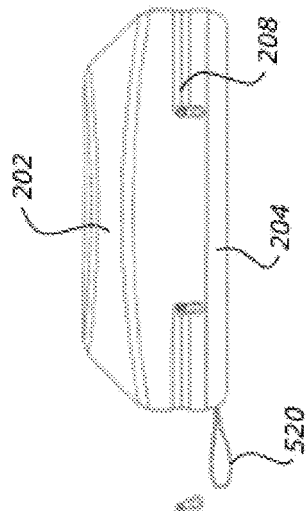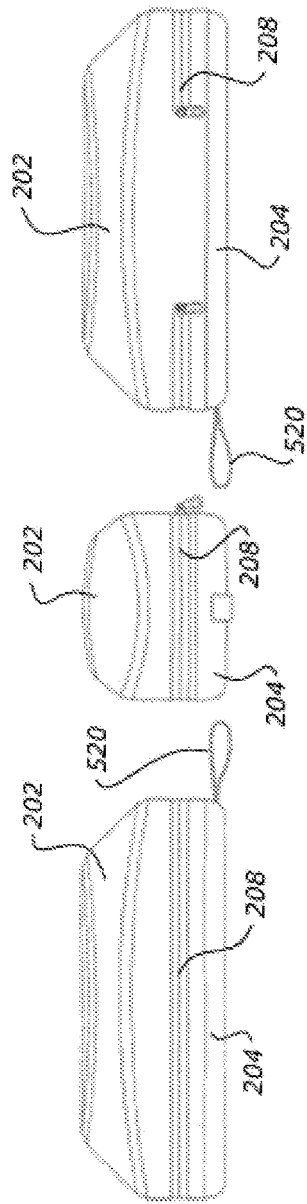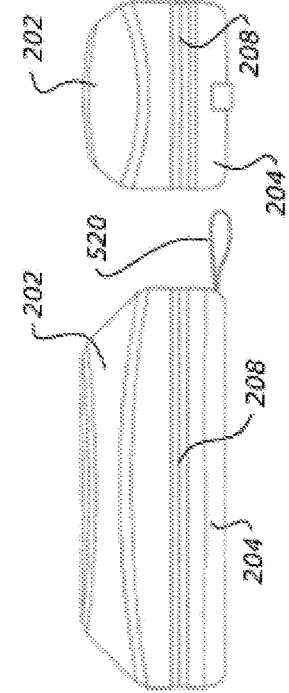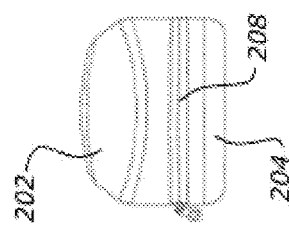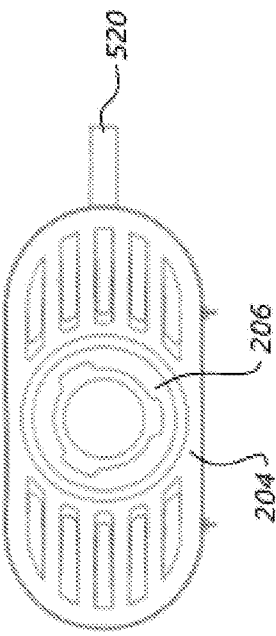
FIGURE 14A
FIGURE 14B
FIGURE 14C
FIGURE 14D
FIGURE 14E
FIGURE 14F

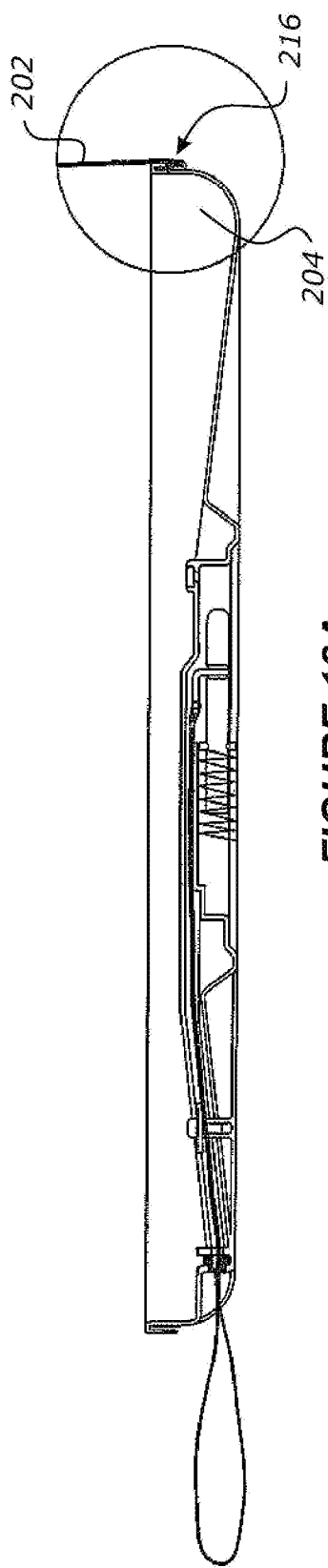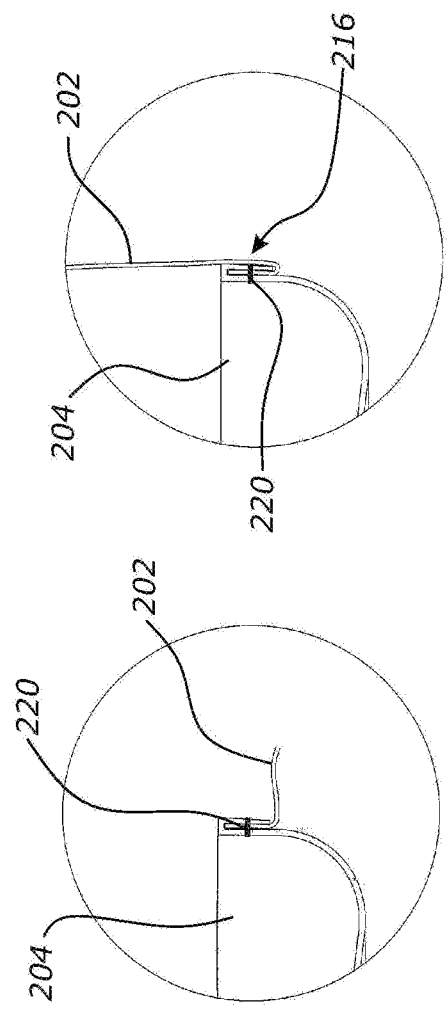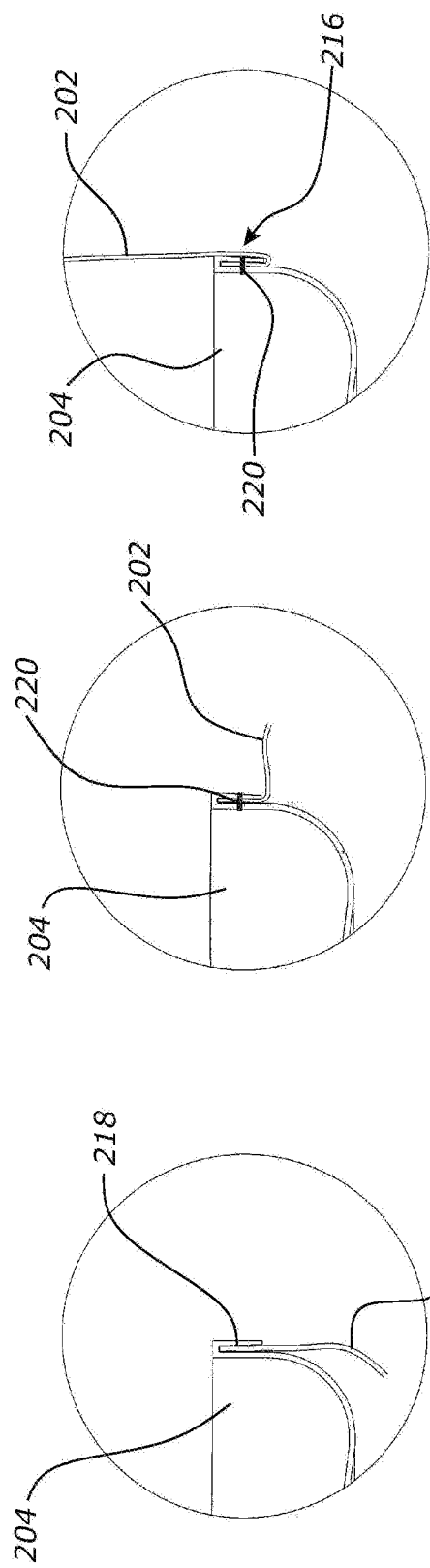
FIGURE 18A
FIGURE 18B
FIGURE 18C
FIGURE 18D

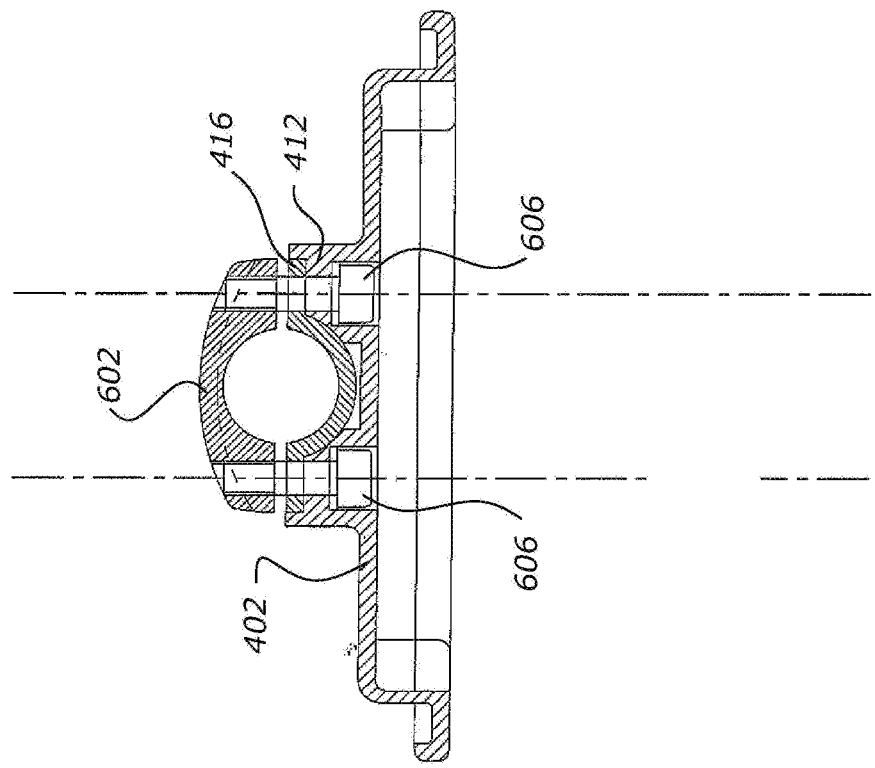
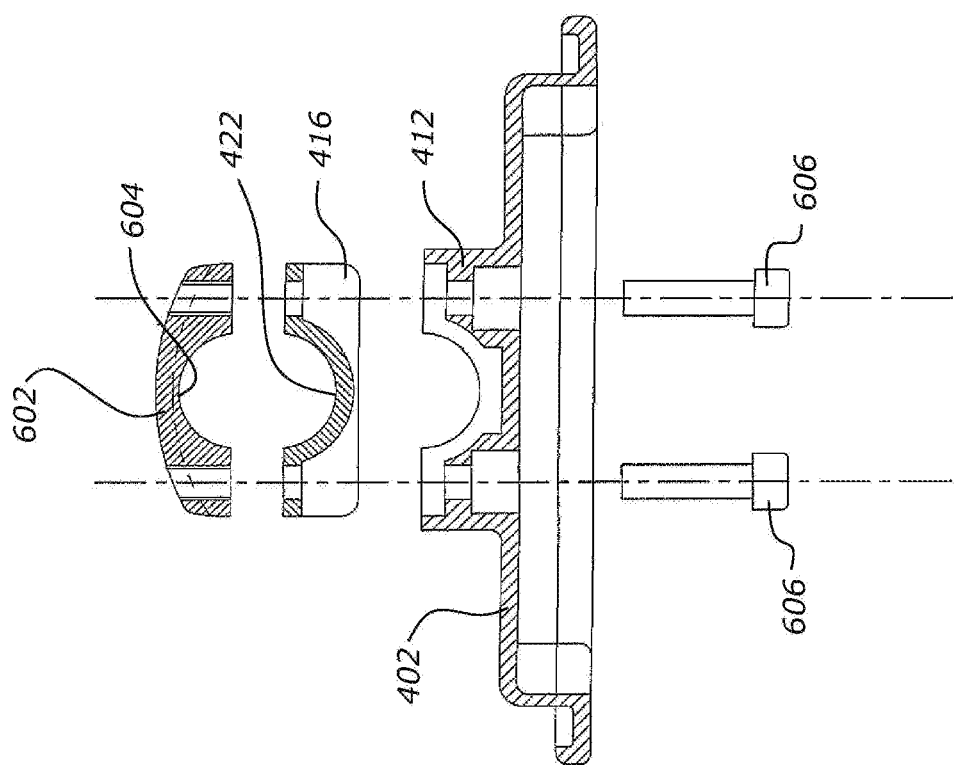
FIGURE 23B
FIGURE 23A

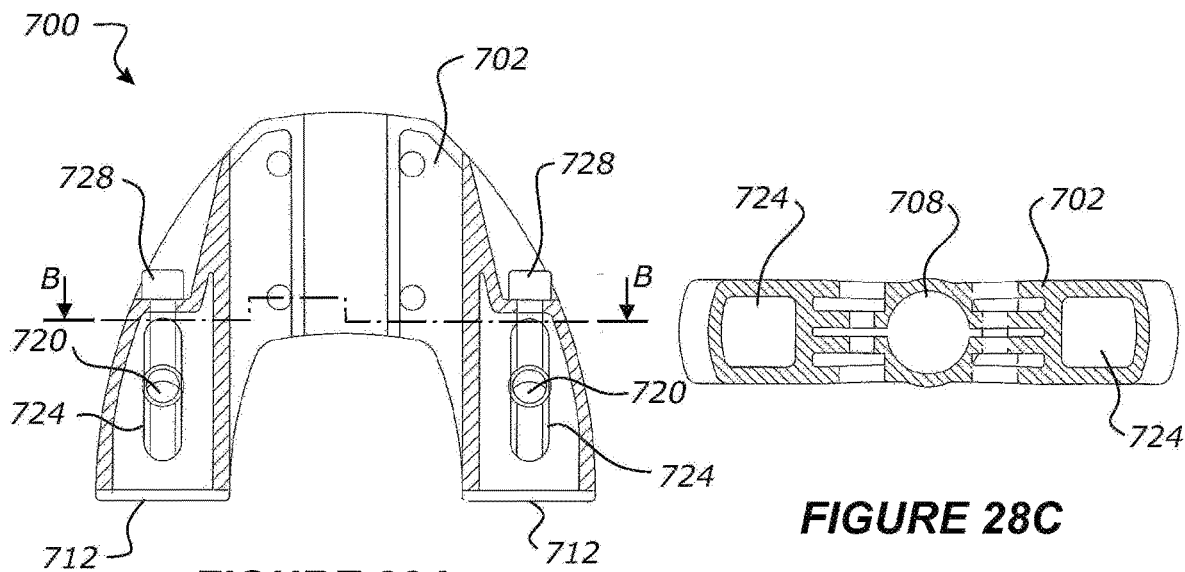
FIGURE 28A
FIGURE 28C
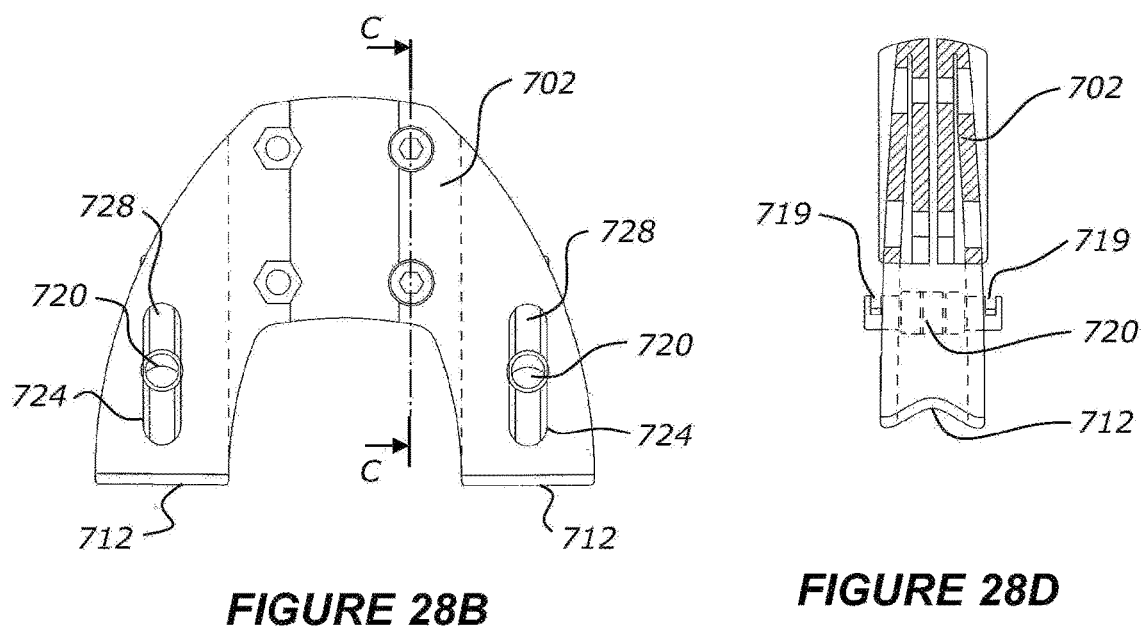
FIGURE 28B
FIGURE 28D

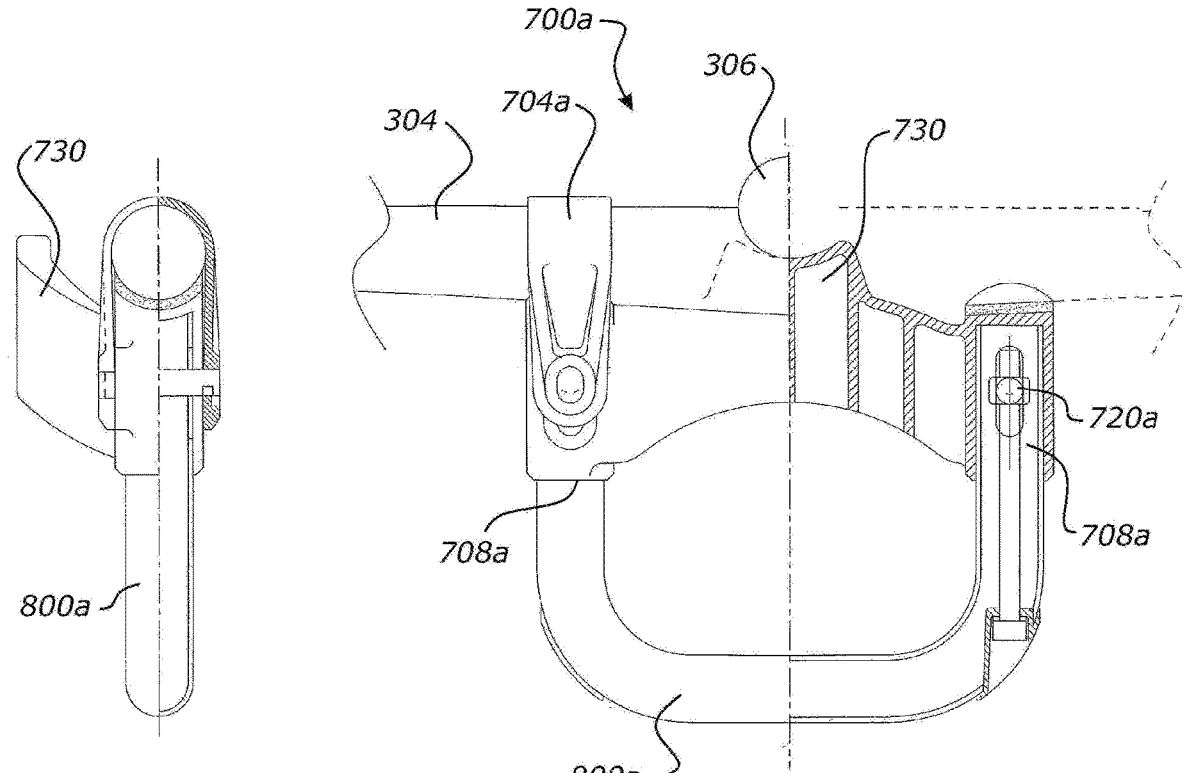
FIGURE 37B
FIGURE 37A
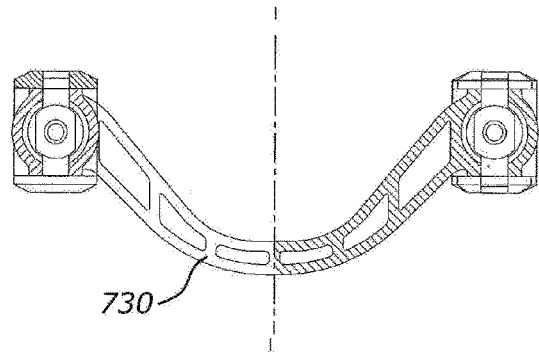
FIGURE 37C

CYCLE ACCESSORY MOUNTING SYSTEM AND ATTACHMENT DEVICE

CROSS REFERENCE TO RELATED APPLICATIONS

This application is a continuation of U.S. patent application Ser. No. 16/979,723, filed Sep. 10, 2020, which application is a National Stage Application, filed under 35 U.S.C. § 371, of International Application No. PCT/NZ2019/050027, filed Mar. 15, 2019, which international application further claims priority to and the benefit of New Zealand Application No. 740794, filed Mar. 16, 2018; the contents of all of which as are hereby incorporated by reference in their entireties.

BACKGROUND

Related Field

This invention relates to a system for mounting an accessory to a cycle.

Description of Related Art

Cyclists often need bags or panniers to carry gear and loads on their cycles. There are different types of cycling activities ranging from on-road use like commuting to work or touring over long distances and multi days, to off-road adventure touring on formed trails or narrow single tracks across different terrain. Known cycle bags and panniers generally cater for each category separately. For road touring and urban use, large soft panniers that are top-hung off carrier racks are typically used. For off-road touring and multi-day single track riding, smaller frame-mounted soft bags are attached via straps directly to the frame, seat, or handlebars.

Traditional panniers, for example as described in U.S. Pat. No. 4,402,439, use hooks to top-hang off front or rear carriers. These carriers are limited by the fact that they require traditional wire carrier racks to be fitted to the cycle. Carrier racks are bulky and can be quite heavy. In addition, they can generally only be installed on cycles fitted with eyelets. There are growing numbers of cycles that do not have eyelets, either due to cycle style or because they have carbon fibre frames. In addition, the suspension and disc brake setup of modern cycles can impede the installation of such carriers. An alternative to the traditional pannier rack is disclosed in patent application US 2010/0327132. This patent application discloses a carrier rack that attempts to overcome some of the problems of traditional pannier racks by mounting the carrier directly to the cycle's front forks or rear stays, presenting a frame that can receive traditional pannier bags. However, like the wire carrier rack it is bulky and quite heavy and still limited to receiving the fabric pannier bags available, which are also bulky and tend to allow the load to sway in use, which can negatively affect the riding experience, particularly when riding off-road.

Another known type of cycle bags are fabric 'frame bags'. These bags are used in particular on mountain bicycles for off-road touring and 'bike-packing' on narrow single tracks. While smaller, lightweight and unobtrusive, they are very limited in the size of load that can be carried. They are also very specific to each type or even make and model of cycle, and generally need to be custom made for a particular cycle. Most handle bar mounted 'frame bags' also interfere with the brake and gear cables in front of the handle bars to some degree.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide an improved system for carrying loads on cycles that addresses at least some of the disadvantages of known systems, and/or to at least provide the public with a useful alternative. It is an alternative object of at least preferred embodiments of the present invention to provide an improved attachment device for use in a system for mounting an accessory to a cycle that enables easy attachment to a cycle component, and/or to at least provide the public with a useful alternative.

BRIEF SUMMARY

In accordance with a first aspect of the invention, there is provided a system for mounting an accessory to a cycle, comprising: a mounting part comprising an axially extending member and at least one transversely projecting lug; a receiving part comprising a recess for receiving the axially extending member and the at least one lug when the receiving part is in a receiving/releasing position relative to the mounting part, and at least one lip for engaging with the at least one lug to retain the mounting part when the receiving part is angularly moved about an axis relative to the mounting part from the receiving/releasing position; and a locking member that is operable between the mounting part and the receiving part, the locking member moveable between an unlocked position and a securing position to selectively retain the receiving part in a plurality of angularly offset locked positions relative to the mounting part.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

The term 'cycle' as used herein refers to any suitable type of cycle, including bicycles, tricycles, road bikes, mountain bikes, urban bikes, cross bikes, e-bikes, e-tricycles, motorcycles, four wheeled 'quad' bikes, and other powered recreational cycles. The cycle may be pedal-powered, powered by a motor, or both. The motor may be an electric motor, a petrol motor, or a diesel motor.

In an embodiment, the system comprises a plurality of receiving/releasing positions. For example, in an embodiment, the system may comprise two, three, four, or more receiving/releasing positions. In an alternative embodiment, the system may comprise a single receiving/releasing position.

In an embodiment, the mounting part is adapted to be mounted to a cycle component.

In an embodiment, the receiving part is connectable to or forms part of an accessory.

In an embodiment, the system further comprises a biasing member for biasing the locking member towards the securing position.

In an embodiment, the axially extending member is substantially circular, and the recess is substantially circular.

In an embodiment, the locking member is moveable in a radial direction. In an alternative embodiment, the locking member is moveable in another direction, such as the axial direction.

In an embodiment, the receiving part comprises the locking member. In an alternative embodiment, the mounting part comprises the locking member.

In an embodiment, the mounting part comprises a plurality of radially inwardly extending teeth. In an alternative embodiment, the teeth extend in a different direction. In an alternative embodiment where the mounting part comprises the locking member, the receiving part comprises the teeth.

In an embodiment, the locking member is adapted to selectively engage with a portion of at least one of the teeth when the receiving part is in one of the locked positions.

In an embodiment, a distance between at least two teeth is substantially the same as a transverse dimension of the locking member to minimise or prevent movement between the locking member and the teeth when the receiving part is in one of the locked positions.

In an embodiment, the mounting part further comprises at least one concave arcuate surface that is adapted to move the locking member away from the securing position when the receiving part is rotated relative to the mounting part from the receiving/releasing position toward the locked positions. In an embodiment, the mounting part comprises a plurality of concave arcuate surfaces, each corresponding to a respective receiving/releasing position.

In an embodiment, a centre of at least one concave arcuate surface is collinear with a centre of at least one lug.

In an embodiment, the at least one lip retains the receiving part relative to the mounting part in an axial direction when the receiving part is in one of the locked positions. In an embodiment, the receiving part comprises a plurality of lips between a plurality of receiving/releasing positions.

In an embodiment, the receiving part comprises at least one slot extending outwardly from a portion of the recess for receiving the at least one lug when the receiving part is in the receiving/releasing position.

In an embodiment, the mounting part comprises a plurality of lugs and the receiving part comprises a plurality of slots.

In an embodiment, the mounting part comprises three lugs and the receiving part comprises three slots.

In an embodiment, the system further comprises a release member operatively connected to the locking member for enabling a user to move the locking member away from the securing position. In an embodiment, the release member comprises a push member or a pull member.

In an embodiment, the mounting part further comprises a mounting bracket for mounting the mounting part to a substantially cylindrical member.

In an embodiment, the system further comprises a rack having a substantially cylindrical member adapted to be received by the mounting bracket and the mounting part.

In an embodiment, the accessory is a bag, a basket, or a carrier.

In accordance with a second aspect of the invention, there is provided an accessory for the system according to the first aspect, wherein the accessory is a bag having a backplate, wherein the receiving part is integrally formed with or connected to the backplate, and wherein the backplate is substantially rigid, at least in a region adjacent the receiving part.

In an embodiment, substantially the entire backplate is rigid.

In an embodiment, the bag has a rigid case.

In an embodiment, the bag has a flexible case. In an embodiment, portions of the flexible case are high frequency welded together. In an embodiment, the flexible case is sewn to the backplate.

In an embodiment, the receiving part comprises an adapter that is adapted to mate with a portion of the receiving part. In an embodiment, the backplate is received between the adapter and the portion of the receiving part.

In accordance with a third aspect of the invention, there is provided an attachment device for use in a system for mounting an accessory to a cycle, comprising: a body defining a slot; a substantially linearly slideable block received in the slot; a retaining member connected to or connectable to the block, the retaining member forming or configured to form a loop extending at least partially around a cycle component; and an adjustment mechanism for changing the linear position of the block relative to the body to adjust the size of the loop to grip the cycle component.

In an embodiment, the adjustment mechanism is a rotatably mounted threaded member.

In an embodiment, rotation of the rotatably mounted threaded member about its axis causes movement of the block along the axis of the rotatably mounted threaded member.

In an embodiment, the attachment device comprises: two spaced apart slots in the body; two linearly slideable blocks, one received in each slot; two retaining members, one associated with each block; and two adjustment mechanisms, one associated with each block.

In an embodiment, the attachment device further comprises an aperture for receiving a substantially cylindrical member.

In an embodiment, the substantially cylindrical member is a portion of a rack adapted to be received by a mounting bracket and a mounting part.

In an embodiment, the attachment device further comprises holes for directly mounting a mounting part to the attachment device.

In accordance with a fourth aspect of the invention, there is provided the combination of the system according to the first aspect and the attachment device according to the third aspect.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE FIGURES

The present invention will now be described by way of example only and with reference to the accompanying drawings in which:

FIGS. 14(A) to (F) show an exemplary bag for use with the mounting system;

FIGS. 18(A) to (D) show an arrangement for a waterproof join between the case and the backplate of the exemplary bag;

FIGS. 23(A) and (B) show section views of the mounting part and clamp, viewed along line W-W (shown in FIG. 7(A));

FIG. 28(A) shows a front section view of the attachment device, viewed along line A-A (shown in FIG. 25(B), and illustrating section line B-B, FIG. 28(B) shows a front view of the attachment device, illustrating section line C-C, and FIGS. 28(C)-(D) show detailed section views of the attachment device, with FIG. 28(C) being along line B-B and FIG. 28(D) being along line C-C;

FIGS. 37(A) to (C) show an alternative attachment device specifically arranged for mounting to the handlebars of a cycle;

DETAILED DESCRIPTION OF VARIOUS EMBODIMENTS

Figure 1:
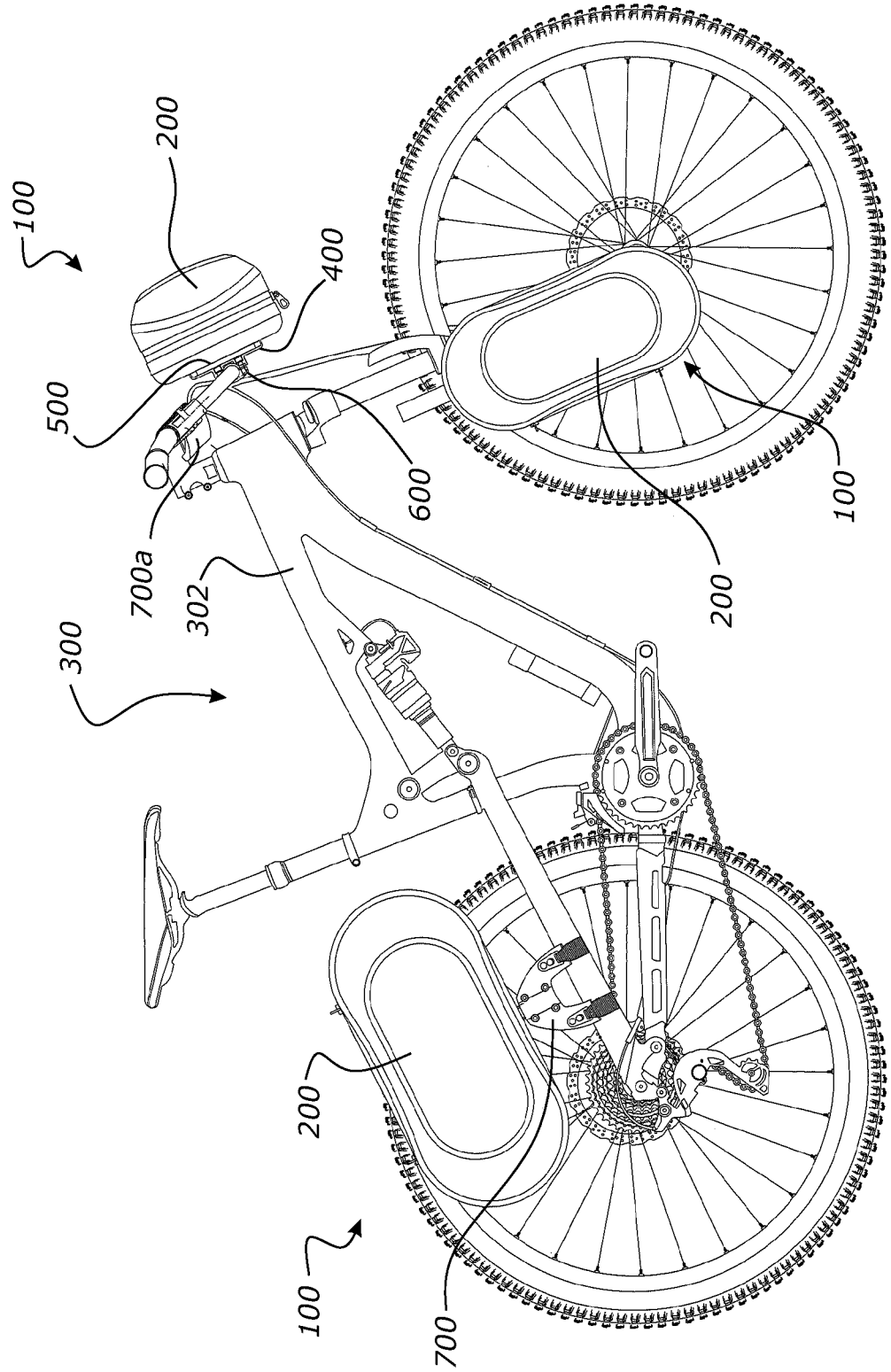
FIG. 1 shows embodiments of a system for mounting an exemplary accessory to a cycle shown in use on a bicycle.
Figure 2:
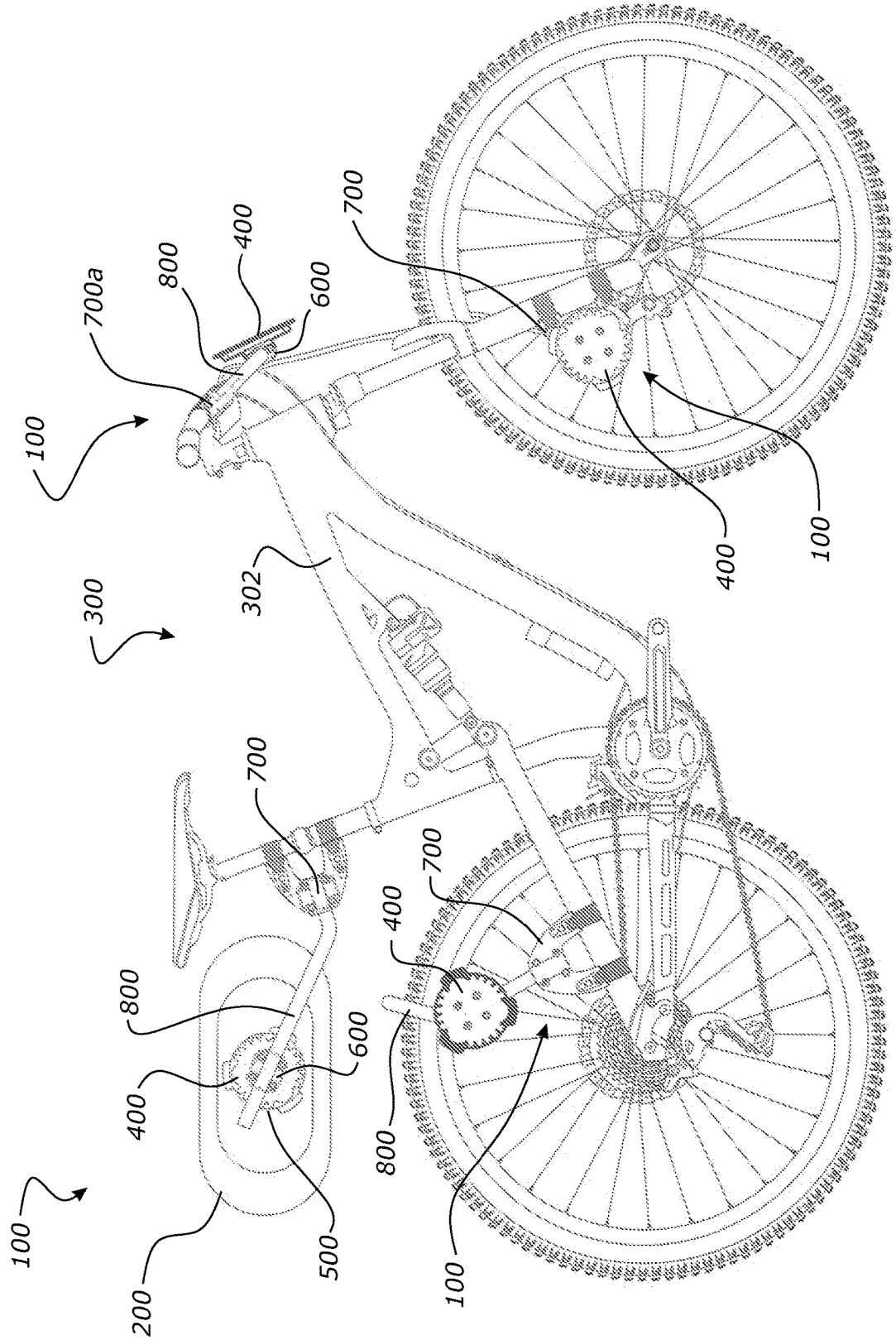
FIG. 2 shows embodiments of a system for mounting an accessory to a cycle with the accessory not shown for clarity.
Figure 9:
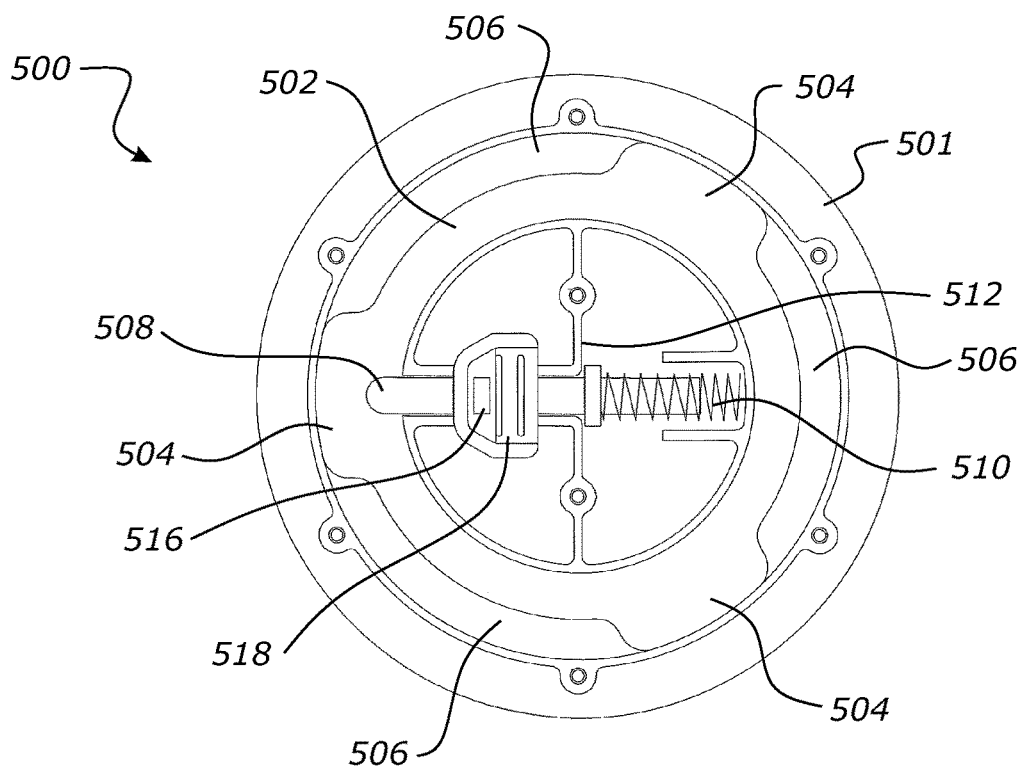
FIG. 9 shows a front view of an exemplary receiving part, with the back portion excluded for clarity.

FIG. 1 and FIG. 2 show various embodiments of a system 100 for mounting an accessory 200 to a cycle 300, which, in the form shown, is a bicycle. The system 100 has a mounting part 400, a receiving part 500, and a locking member 508 (FIG. 9). The mounting part 400 is adapted to be directly or indirectly mounted to a cycle component 302. The receiving part 500 is connectable to or forms part of an accessory 200. The locking member 508 is operable between the mounting part 400 and the receiving part 500.

FIG. 2 shows some embodiments of the system 100 without the accessory 200 and receiving part 500 mounted on the mounting part 400 for clarity.

The cycle component can include a portion of a cycle frame, or another component of a cycle such as a seat post, suspension component, fork, or handlebars.

In the embodiment shown, a portion of the receiving part 500 is integrally formed with the accessory 200. In alternative embodiments, the receiving part 500 is retrofitted to an accessory 200, or is fitted to a portion of an accessory 200 during manufacture.

Figure 3:
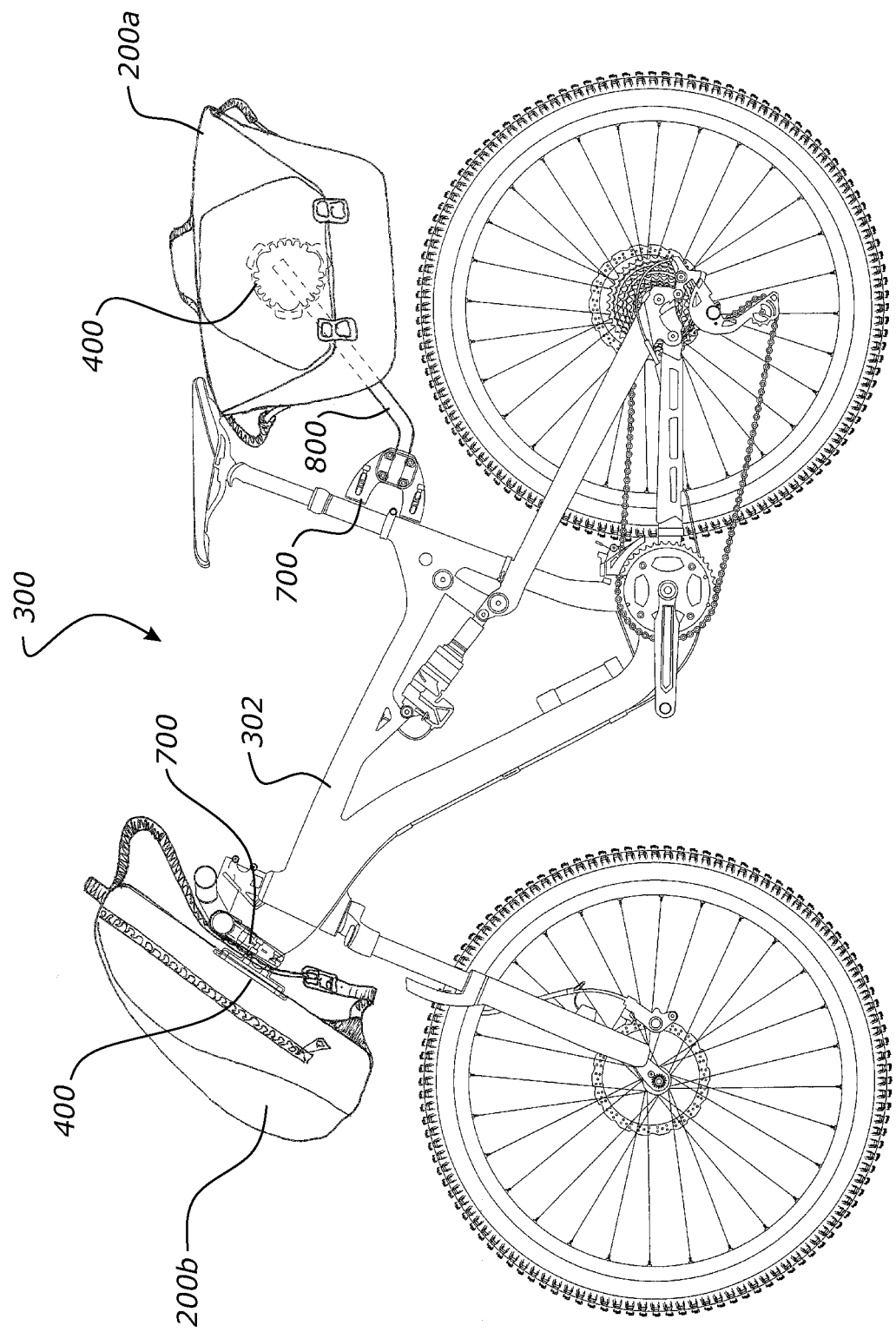
FIG. 3 shows alternative accessories mounted to a cycle using the system of FIGS. 1 and 2.
Figure 4:
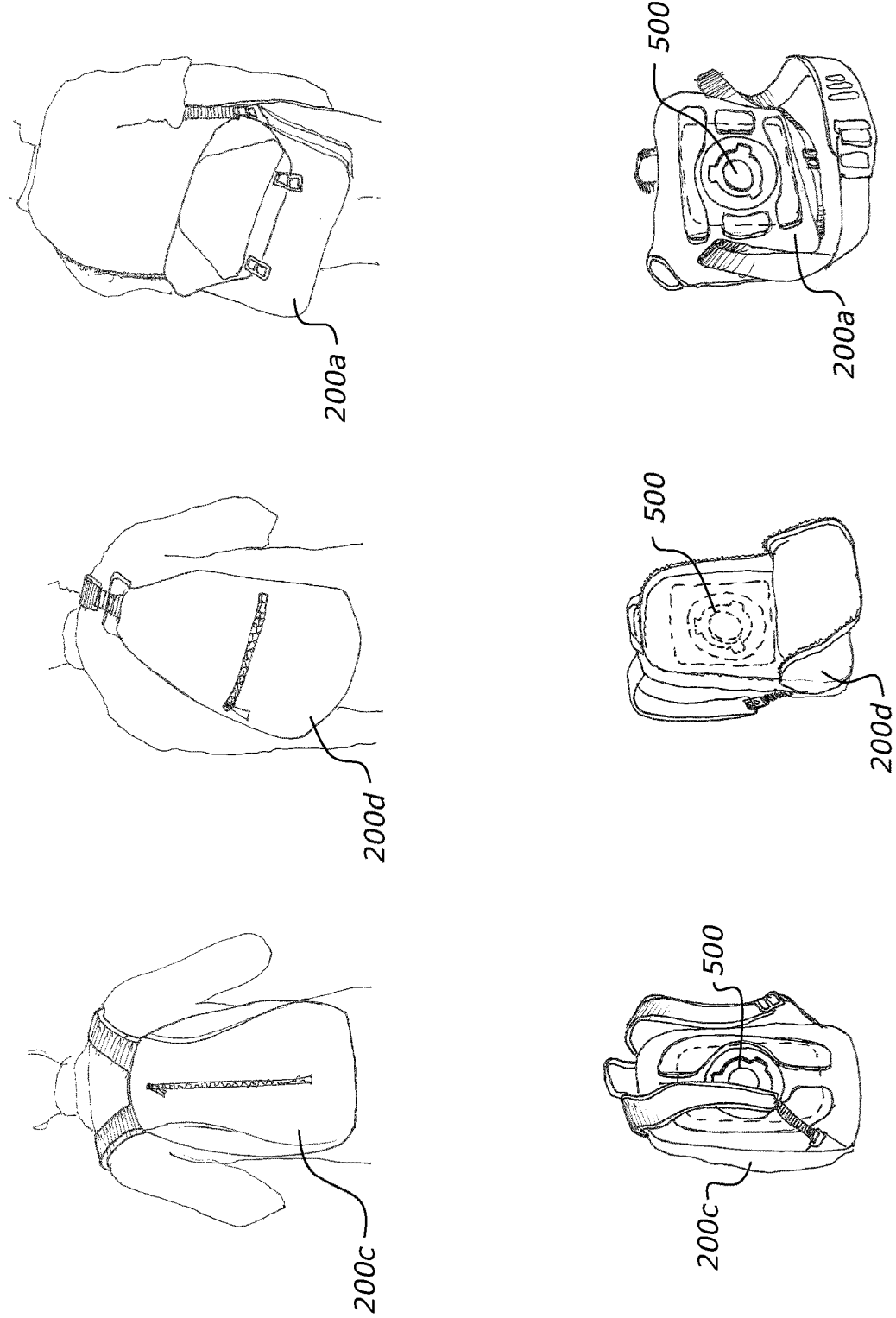
FIG. 4 shows further detail of alternative accessories suitable for use with the system of FIGS. 1 and 2.

In the embodiments shown, the accessory 200 is a bag. The bag may be a carry bag, a backpack, a messenger bag, or a grocery bag. FIG. 3 and FIG. 4 show alternative exemplary bag designs 200a, 200b, 200c, 200d suitable for use with the system 100. In alternative embodiments, the accessory 200 is another type of accessory, such as a basket or a carrier.

The mounting part 400 can be mounted to a portion of a cycle component 302 in different ways. In an embodiment, the mounting part 400 is directly mounted to a portion of the cycle component 302, for example via a clamp 600. In an embodiment, the mounting part 400 is mounted to the cycle component 302 via an attachment device 700. In the embodiment shown, the attachment device 700 is mountable to the cycle component 302 via a pair of retaining members. In an embodiment, the mounting part 400 is directly mounted to the attachment device 700. In an embodiment, a rack 800 is mounted to the attachment device 700, and the mounting part 400 is mounted to the rack 800 via a clamp 600.

FIG. 5, FIG. 6 and FIGS. 7A-C show an exemplary mounting part 400. The mounting part 400 comprises an axially extending member 402 that extends in the direction of axis A-A, and at least one transversely projecting lug 406. In the embodiment shown, the body of the mounting part forms the axially extending member 402. In the embodiment shown, the axially extending member 402 comprises a base 402a and a projecting peripheral wall 402b; however, it will be understood that the axially extending member 402 could have a different configuration. The lug(s) 406 may project radially from the axially extending member 402, or may project at a different angle.

In the embodiment shown, the mounting part 400 comprises a plurality of radially inwardly extending teeth 404. In an alternative embodiment, the receiving part 500 comprises the plurality of radially inwardly extending teeth 404. In an alternative embodiment, the receiving part 500 comprises a plurality of radially outwardly extending teeth 404.

Figure 8:
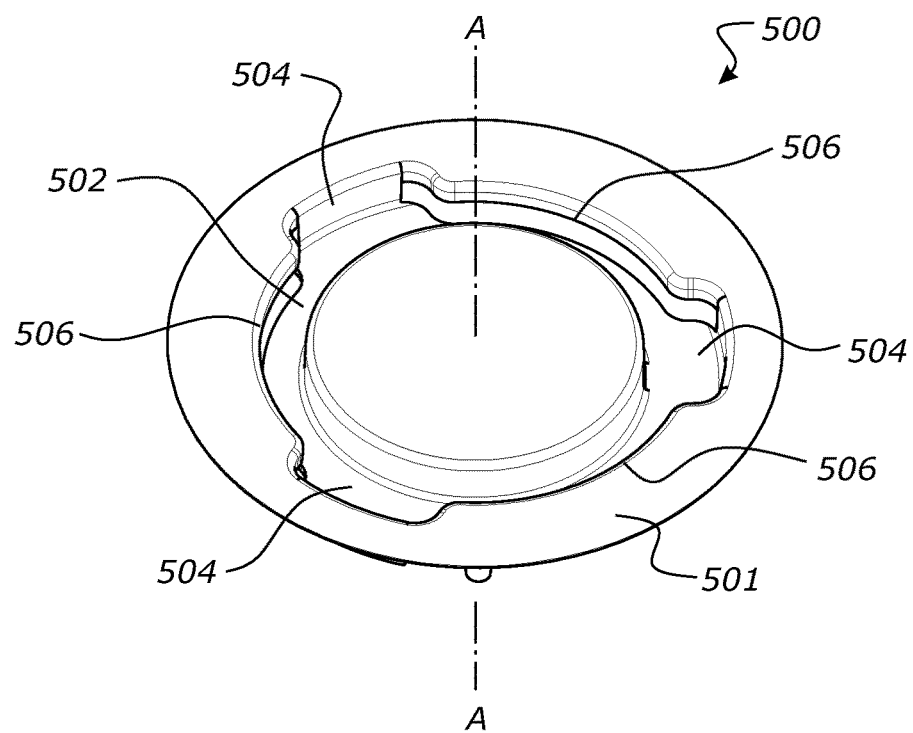
FIG. 8 shows a perspective view of the back of an exemplary receiving part, with the back portion excluded for clarity.

FIG. 8 and FIG. 9 show an exemplary receiving part 500. These figures show the main portion 501 of the receiving part 500. The receiving part 500 may also have a back portion 514, which is omitted from these figures for clarity. The receiving part 500 has a recess 502 for receiving the axially extending member 402 and at least one lug 406 when the receiving part 500 is in a receiving/releasing position relative to the mounting part 400. The receiving part 500 has at least one lip 506 for engaging with the at least one lug 406 to retain the mounting part 400 when the receiving part 500 is angularly moved about an axis A-A relative to the mounting part 400 from the receiving/releasing position.

The receiving part 500 has at least one slot 504 extending outwardly from a portion of the recess 502 for receiving the at least one lug 406 when the receiving part 500 is in the receiving/releasing position.

In the embodiment shown, the receiving part 500 comprises the locking member 508. The locking member 508 is moveable between a retracted unlocked position and an extended securing position to selectively retain the receiving part 500 in a plurality of angularly offset locked positions relative to the mounting part 400. The locking member 508 is adapted to selectively engage with a portion of at least one of the teeth 404 when the receiving part 500 is in one of the locked positions.

In an alternative embodiment, the mounting part 400 comprises the locking member 508, and the receiving part 500 comprises the teeth 404. Having the locking member 508 and the release member 520 in the receiving part 500 rather than the mounting part 400 is preferred so that it is not necessary to reach behind the accessory 200 to access the release member 520.

The plurality of angularly offset locked positions are at different orientations to the receiving/releasing position.

In an embodiment, the system comprises a plurality of receiving/releasing positions.

In an embodiment, the at least one lip 506 retains the receiving part 500 relative to the mounting part 400 in the axial direction when the receiving part 500 is in one of the locked positions.

In an embodiment, a biasing member 510 biases the locking member 508 towards the securing position (FIGS. 8, 9, 13(A) and 13(C). The biasing member could be any suitable type of member, such as a compression spring, leaf spring, or resilient member.

In the embodiment shown, the locking member 508 is a pin, arranged so that the system 100 comprises a bayonet-type connection for enabling a user to quickly engage an accessory 200 with a cycle 300 and/or to quickly release an accessory 200 from a cycle 300.

Exemplary embodiments of parts of the system 100 for mounting an accessory 200 to a cycle 300 will now be described in more detail.

Figure 5:
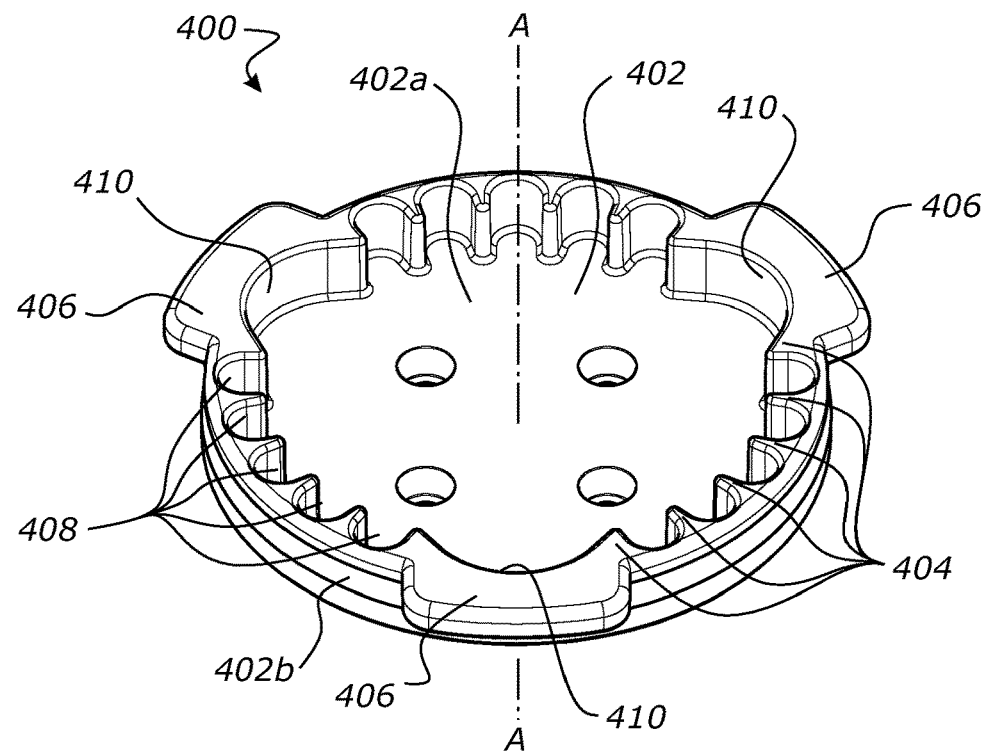
FIG. 5 shows a perspective view of an exemplary mounting part.
Figure 6:
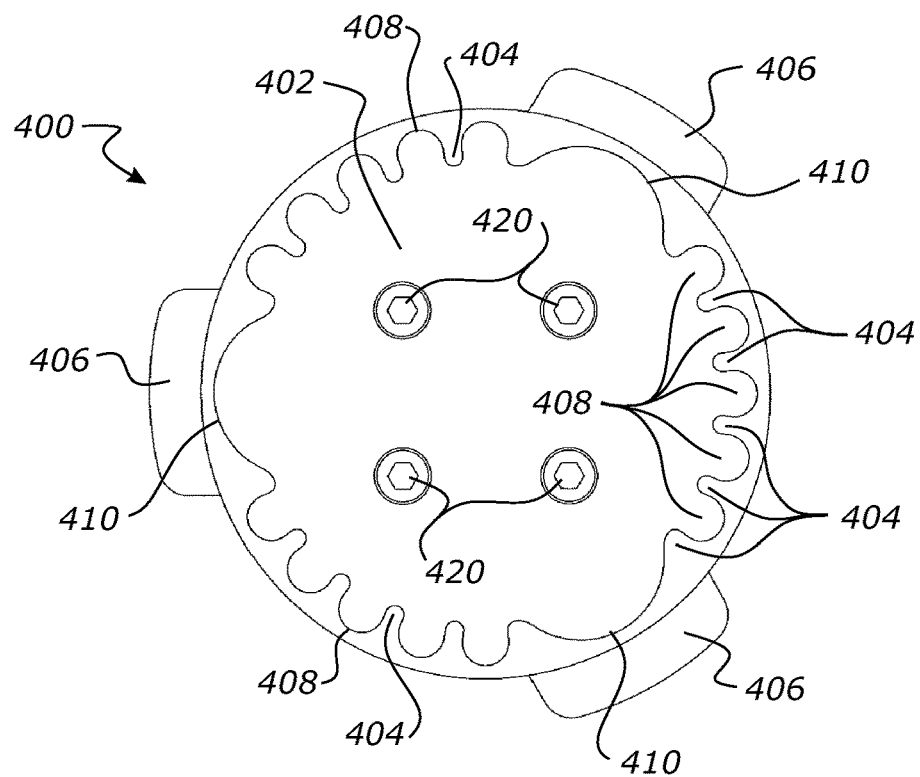
FIG. 6 shows a front view of an exemplary mounting part.

FIG. 5 shows a perspective view of an exemplary mounting part 400. FIG. 6 shows the exemplary mounting part 400 viewed from the front (the side that is inserted into the receiving part 500). The axially extending member 402 of the mounting part 400 is substantially circular, allowing the mounting part 400 to rotate within the recess 502 of the receiving part 500.

A distance between at least two teeth 404 of the mounting part 400 is substantially the same as a transverse dimension of the locking member 508 to minimise or prevent movement between the locking member 508 and the teeth 404 when the receiving part 505 is in one of the locked positions.

In the embodiment shown, three groups of six teeth 404 are suitably spaced to each define five recesses 408 for receiving the locking member 508 of the receiving part 500, allowing the receiving part 500 to be mounted at fifteen different angular orientations relative to the mounting part 400.

In alternative embodiments, a different number of teeth 404 may be used depending on the desired number of different orientations of the receiving part 500 relative to the mounting part 400.

In an embodiment, the mounting part 400 has at least one concave arcuate surface 410 that is adapted to move the locking member 508 away from the securing position when the receiving part 500 is rotated relative to the mounting part 400 from the receiving/releasing position to the locked positions.

In an alternative embodiment where the locking member 508 is carried by the mounting part 400, the receiving part 500 has at least one concave arcuate surface 410.

In the embodiment shown, the axially extending member 402 comprises three concave arcuate surfaces 410 located between the three groups of teeth 404. A centre of at least one concave arcuate surface 410 is collinear with a centre of at least one lug 406 of the mounting part 400, such that when the slot 504 of the receiving part 500 receives the lug 406, the centre of the concave arcuate surface 410 receives the locking member 508. In an embodiment, the distance from the centre of the mounting part 400 to the centre of the concave arcuate surface 410 is greater than the distance from the centre of the receiving part 500 to the end of the locking member 508 when the locking member 508 is in the securing position. This enables the mounting part 400 to be received by the receiving part 500 in the receiving/releasing position with minimal resistance from the locking member 508.

In an embodiment, the mounting part 400 comprises a plurality of lugs 406. In the embodiment shown, the mounting part 400 comprises three lugs 406. In alternative embodiments, the mounting part 400 may comprise any suitable number of lugs 406. The mounting part may have a corresponding number of arcuate surfaces. The locations of the lugs 406 correspond to the locations of the slots 504 on the mounting part 400. In preferred embodiments, the mounting part 400 has the same number of lugs 406 as the number of slots 504 on the receiving part 500. The lugs 406 are sized and shaped to be slightly smaller than the slots 504 of the receiving part 500, such that the mounting part 400 is able to be inserted into the receiving part 500 with minimal resistance.

In preferred embodiments, the lugs 406 are equidistantly spaced around the axially extending member 402. In the embodiment shown, the lugs 406 are spaced 120° from each other. Spacing the lugs 406 equidistantly enables the corresponding slots 504 of the receiving part 500 to initially receive the lugs 406 in the receiving/releasing position at as many different orientations as there are lugs 406. For example, in the embodiment shown in the figures, three different initial orientations are possible.

In preferred embodiments, no two lugs 406 are spaced 180° from each other. This is because the corresponding slots 504 in the receiving part 500 would cause the receiving part 500 to no longer be retained when the receiving part 500 was rotated 180° from the receiving/releasing position, excluding a potentially useful configuration.

In an embodiment, the lugs 406 are unequally spaced. In this embodiment, there are fewer available orientations for the receiving/releasing position than the number of lugs 406.

Figure 7C:
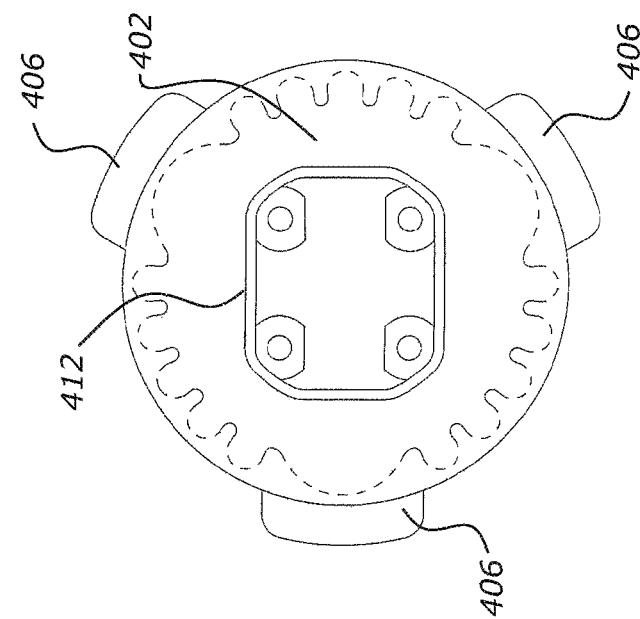
FIGS. 7A-C shows front (A), side section (B) and back (C) views of an exemplary mounting part having a mounting bracket.
Figure 7B:
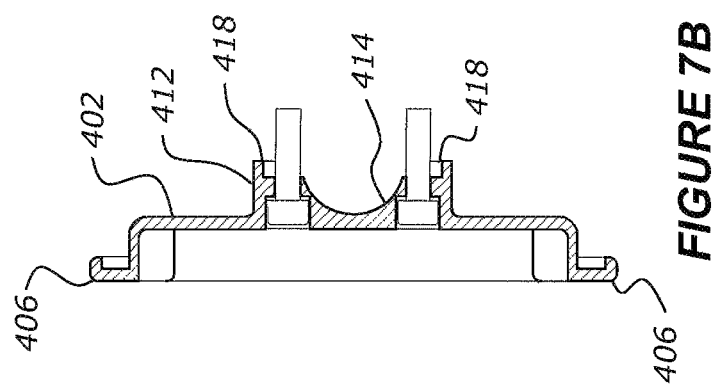
Figure 7A:
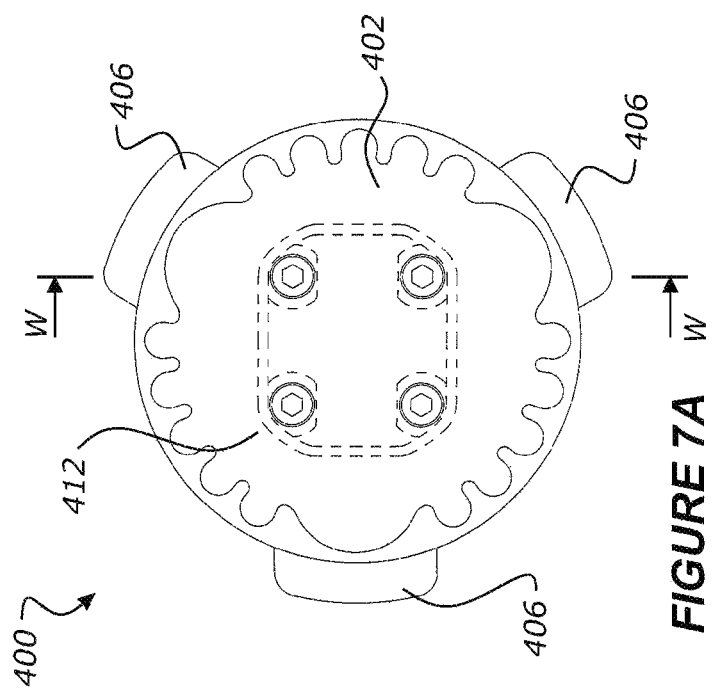

Referring to FIGS. 7A-C, in an embodiment, the mounting part 400 has a mounting bracket 412. In an embodiment, the mounting bracket 412 receives a clamp fitting 416 (FIGS. 23A-B) that is used in combination with a clamp member 602 (discussed in more detail below). The clamp fitting 416 and the clamp member 602 are adapted to receive and retain a portion of a cycle component 302 and/or rack 800. In the embodiment shown, the clamp fitting 416 and the clamp member 602 are adapted to receive and retain a substantially cylindrical member. In alternative embodiments, the clamp fitting 416 and the clamp member 602 are adapted to receive and retain a member having any other suitable cross section, such as a rectangular, square, or oval cross section.

The mounting bracket 412 also has a plurality of substantially flat portions 418. The mounting bracket 412 has a plurality of holes 420 for receiving fasteners. In an embodiment, the mounting bracket 412 is fastened to a substantially flat surface, such as a portion of an attachment device 700 (discussed in more detail below). In an embodiment, the mounting bracket 412 has a recessed portion 414 for receiving a protruding portion of the attachment device 700.

In an embodiment, two mounting parts 400 are mounted to each other to receive and retain a portion of a cycle component 302 and/or rack 800. In an embodiment, two mounting parts 400 having clamp fittings 416 are mounted to each other to receive and retain a portion of a cycle component 302 and/or rack 800 therebetween. An exemplary location for this is the seat post rack 800 shown in FIG. 36.

FIG. 8 shows a perspective view of an exemplary receiving part 500. FIG. 9 shows the exemplary receiving part 500 viewed from the front (the opposite side to the side that receives the mounting part 400). The recess 502 of the receiving part 500 is substantially circular, allowing the mounting part 400 to rotate within the receiving part 500. In an embodiment, a diameter of the recess 502 is slightly larger than a diameter of the axially extending member 402, such that the mounting part 400 is able to freely rotate within the receiving part 500.

In an embodiment, the receiving part 500 comprises a plurality of outwardly extending slots 504. In the embodiment shown, the receiving part 500 comprises three slots 504. In alternative embodiments, the receiving part 500 may comprise any suitable number of slots 504. For example, the receiving part 400 may have a single slot, two slots, or four or more slots.

The locations of the slots 504 correspond to the locations of the lugs 406 on the mounting part 400. In preferred embodiments, the receiving part 500 has the same number of slots 504 as the number of lugs 406 on the mounting part 400. The slots 504 are sized and shaped to be slightly larger than the lugs 406 of the mounting part 400, such that the mounting part 400 is able to be inserted into the receiving part 500 with minimal resistance.

Figure 10:
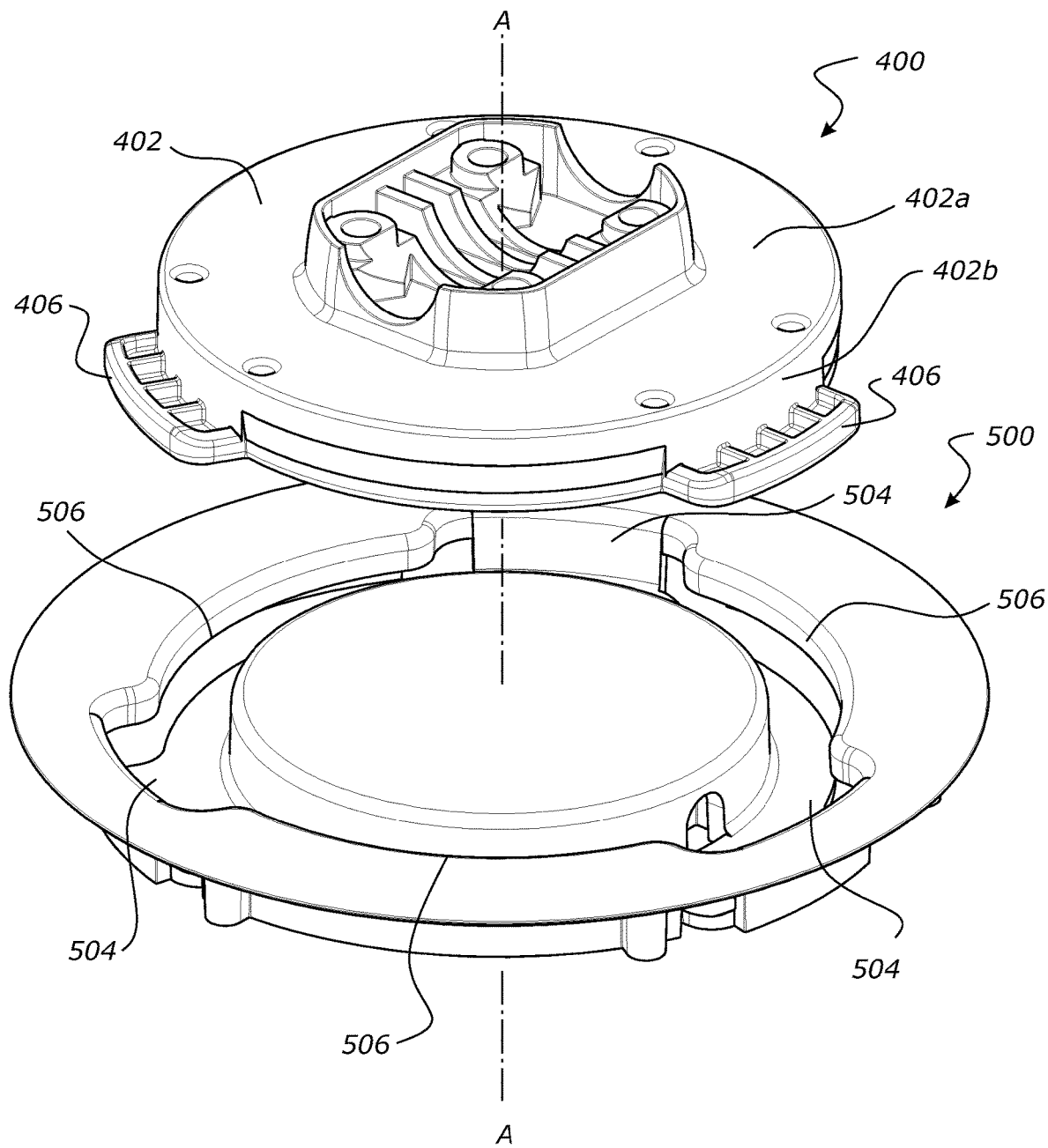
FIG. 10 shows a perspective view of the mounting part and the receiving part just prior to the mounting part being received by the receiving part, with the back portion of the receiving part excluded for clarity.

FIG. 10 shows a perspective view of the orientation of the exemplary receiving part 500 relative to the exemplary mounting part 400 just prior to the mounting part 400 being received by the receiving part 500. The receiving part 500 is positioned relative to the mounting part 400 so that the slots 504 of the receiving part 500 are aligned with the lugs 406 of the mounting part 400.

Figure 11:
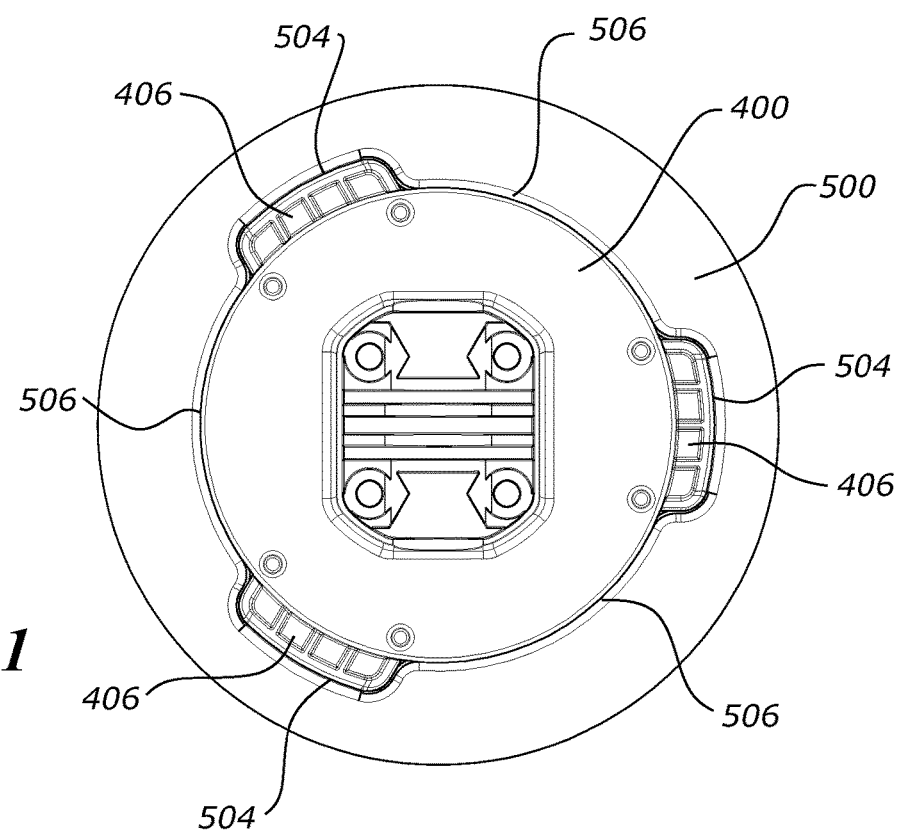
FIG. 11 shows a back view of the mounting part and the receiving part when the mounting part is initially received by the receiving part in the receiving/releasing position.

FIG. 11 shows the orientation of the receiving part 500 relative to the mounting part 400 when the mounting part 400 is initially received by the receiving part 500 in the receiving/releasing position. The lugs 406 of the mounting part 400 are received by the slots 504 of the receiving part 500. The receiving part 500 is not yet engaged with the mounting part 400.

Figure 12:
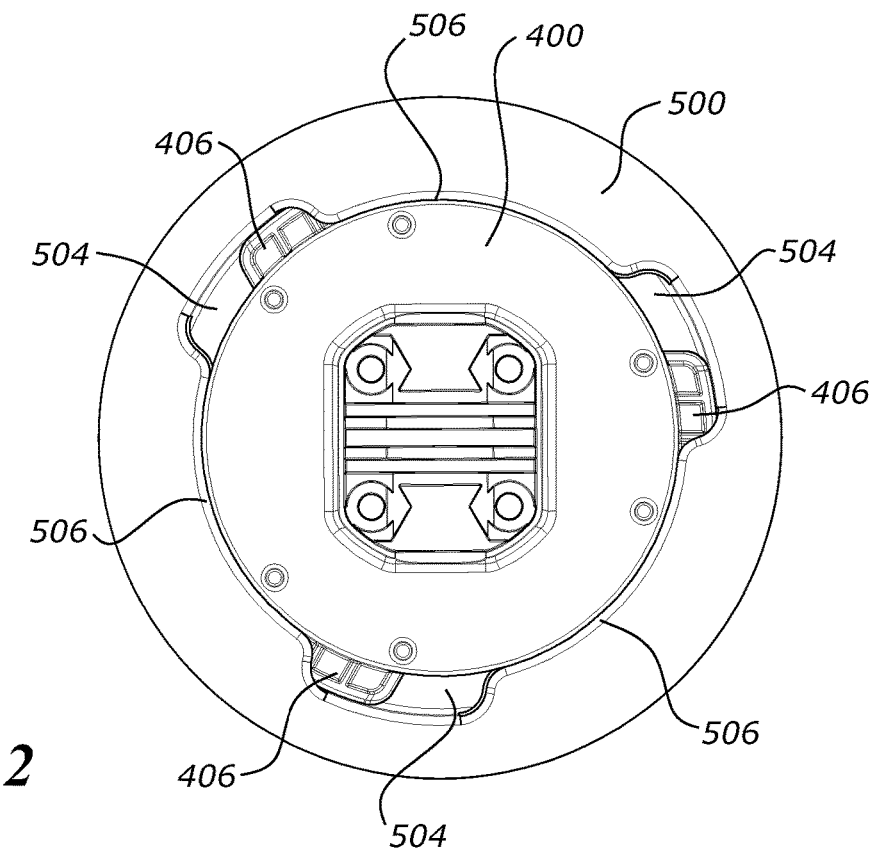
FIG. 12 shows a back view of the receiving part rotated relative to the mounting part away from the receiving/releasing position.

FIG. 12 shows the receiving part 500 rotated anti-clockwise relative to the mounting part 400 away from the receiving/releasing position. The lugs 406 of the mounting part 400 are retained by the lip 506 of the receiving part 500, and the receiving part 500 is engaged with the mounting part 400.

In an embodiment, the receiving part 500 has fewer slots than the number of lugs on the mounting part 400. For example, the receiving part could have two slots 504, and the mounting part 400 could have three lugs 406. One lug 406 of the mounting part 400 could be inserted on an angle under the lip 506 of the receiving part 500, and the remaining two lugs 406 could then be inserted into the slots 504.

In preferred embodiments, the slots 504 are equidistantly spaced around the recess 502. In the embodiment shown, the slots 504 are spaced 120° from each other. Spacing the slots 504 equidistantly enables the corresponding lugs 406 of the mounting part 400 to be initially received by the slots 504 in the receiving/releasing position at as many different orientations as there are slots 504. For example, in the embodiment shown in the figures, three different initial orientations are possible.

In preferred embodiments, no two slots 504 are spaced 180° from each other. This is because the corresponding lugs 406 in the mounting part 400 would no longer be retained by the receiving part 500 when the receiving part 500 was rotated 180° from the receiving/releasing position, excluding a potentially useful configuration.

In an embodiment, the slots 504 are unequally spaced. In this embodiment, there are fewer available orientations for the receiving/releasing position than the number of slots 504.

The receiving part 500 has a support portion 512 for receiving and supporting the locking member 508 and the biasing member 510. The mounting part 400 is retained in an axial direction by a back portion 514 of the receiving part 500 (see FIGS. 16(B), 19 and 20) when the mounting part 400 is engaged with the receiving part 500. The back portion 514 may be in the form of a plate, or may be any other suitable configuration. The lugs 406 of the mounting part 400 may engage with a portion of the back portion 514 that is substantially flush with the rear face of the recess 504 (see FIG. 20).

In the embodiment shown, the back portion 514 and the main portion 501 of the receiving part 500 are formed as separate components. In an alternative embodiment, the receiving part 500 is formed as a single component that includes the features of the main portion 501 and the back portion 514.

The locking member 508 is moveable in a radial direction. In an alternative embodiment, the locking member 508 is moveable in a different direction, such as in an axial direction.

The locking member 508 is moveable between a securing position and a retracted position. In the embodiment shown, the locking member 508 is biased towards the securing position by a compression spring 510. In alternative embodiments, the locking member 508 is biased towards the securing position by another type of biasing member, such as by a tension spring or a gas spring.

A release member 520 is operatively connected to the locking member 508 for enabling a user to move the locking member 508 away from the securing position.

In the embodiment shown, the locking member 508 has a transversely extending finger 516 that engages with a bracket 518 for receiving the release member 520. A user pulls on the release member 520 to move the locking member 508 away from the securing position. In the embodiment shown, the release member 520 is a flexible retaining member, such as a strap, cord, wire, or cable (see FIGS. 16-21). In alternative embodiments, the release member 520 is a rigid member such as a rigid bar. In an embodiment, a user pushes on the release member 520 to move the locking member 508 away from the securing position. In an embodiment, the release member 520 is directly connected to the locking member 508.

The release member 520 may be used as a handle to carry the bag 200 or other accessory when the bag/accessory is not mounted to the cycle.

FIGS. 13(A)-(D) show how the locking member 508 of the receiving part 500 engages with the axially extending member 402 of the mounting part 400. Other features of the receiving part 500 are omitted for clarity. These figures show the locking member 508 remaining in the same rotational orientation and the mounting part 400 rotating relative to the locking member 508. This is for illustrative purposes only. In practice, the mounting part 400 is fixed to the cycle and the receiving part 500 (including the locking member 508) rotates relative to the mounting part 400.

Figure 13A:
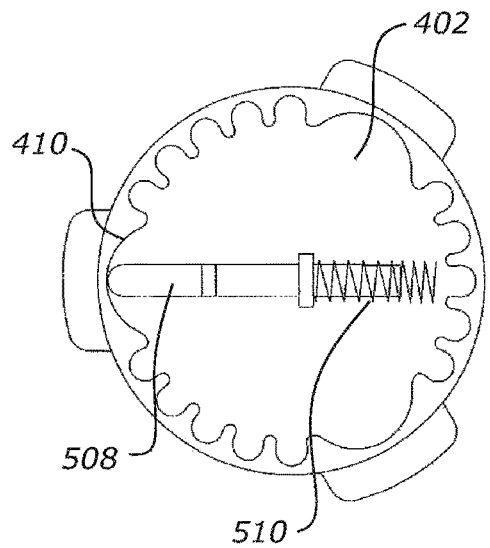
FIGS. 13(A) to (D) show how the locking member of the receiving part engages with the axially extending member of the mounting part.

FIG. 13(A) shows the orientation of the locking member 508 relative to the mounting part 400 when the mounting part 400 is initially received by the receiving part 500 in the receiving/releasing position. The centre of the concave arcuate surface 410 receives the locking member 508 in the securing position. The relative positions of the mounting part 400 and receiving part 500 shown in FIG. 13(A) correspond to the relative positions shown in FIG. 11.

Figure 13B:
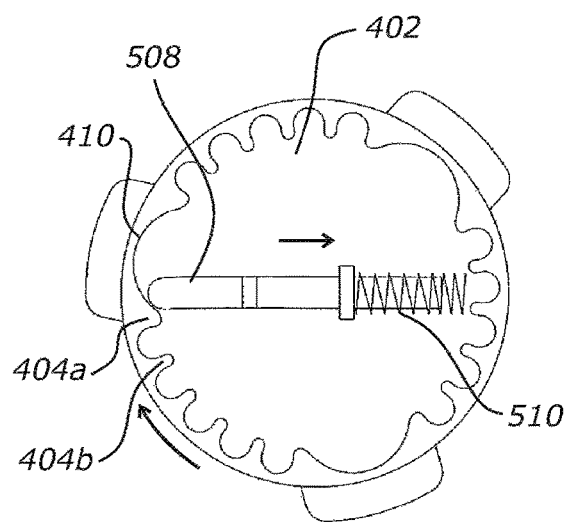

FIG. 13(B) shows the mounting part 400 being rotated clockwise relative to the receiving part 500. The concave arcuate surface 410 moves the locking member 508 away from the securing position. As the mounting part 400 is rotated further in a clockwise direction, the locking member 508 passes over a first tooth 404a and is biased into the space between the first tooth 404a and a second tooth 404b by the biasing member 510. The relative positions of the mounting part 400 and receiving part 500 shown in FIG. 13(B) correspond to the relative positions shown in FIG. 12.

Figure 13C:
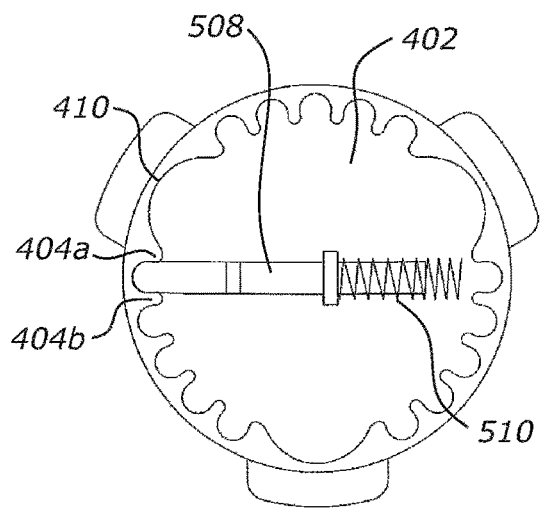

FIG. 13(C) shows the mounting part 400 after it has been biased into the space between the first tooth 404a and the second tooth 404b by the biasing member 510. In this configuration, further rotation of the mounting part 400 relative to the receiving part 500 is substantially prevented due to the locking member 508 engaging with a portion of the first tooth 404a and/or the second tooth 404b. The lugs 406 of the mounting part 400 are retained by the lip 506 of the receiving part 500 in this configuration (not illustrated). Thus, the receiving part 500 is engaged with the mounting part 400.

Figure 13D:
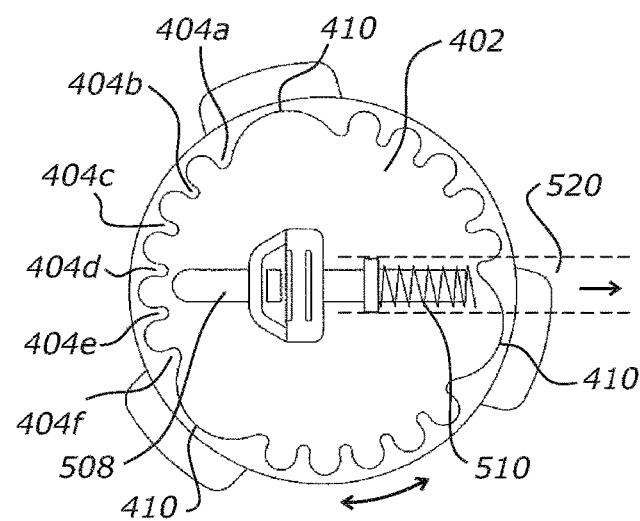

FIG. 13(D) shows the locking member 508 moved to the retracted position by application of force to the release member 520 by a user. While the locking member 508 is in the retracted position, the mounting part 400 is freely rotatable relative to the receiving part 500. The mounting part 400 is rotatable relative to the receiving part 500 such that the locking member 508 can be aligned with a space between any of the first tooth 404a and the second tooth 404b, the second tooth 404b and the third tooth 404c, the third tooth 404c and the fourth tooth 404d, the fourth tooth 404d and the fifth tooth 404e, or the fifth tooth 404e and the sixth tooth 404f in any of the groups of teeth while the lugs 406 remain retained by the lip 506 of the receiving part 500. When the user releases the release member 520, the locking member 508 is biased by the biasing member 510 into the closest space between two teeth 404, and the receiving part 500 is engaged with the mounting part 400 in the desired orientation. The spaces between the teeth provide a plurality of discrete or indexed angularly offset locked positions.

In order to remove the receiving part 500 from the mounting part 400, force is applied to the release member 520 as shown in FIG. 13(D). The mounting part 400 is rotated relative to the receiving part 500 such that the locking member 508 is aligned with one of the concave arcuate surfaces 410. This allows the lugs 406 of the mounting part 400 to align with the slots 504 of the receiving part 500, and enables the receiving part 500 to be removed from the mounting part 400.

FIGS. 14(A)-(F) shows an exemplary accessory 200 for use with the mounting system 100. The accessory 200 is a bag having a backplate 204. The receiving part 500 is integrally formed with or connected to the backplate 204, and the backplate 204 is rigid, at least in a region adjacent the receiving part 500.

In an embodiment, the bag has a flexible case 202. The case may be made of fabric or any other suitable material. The flexible case 202 is collapsible upon application of a small force, but advantageously holds its expanded shape in the absence of the force. Alternatively, the case 202 may be rigid.

A portion of the receiving part 500 is integrally formed with the backplate 204. A faceplate 206 comprising the recess 502, the slots 504 and the lip 506 is formed separately. In an embodiment, the faceplate 206 is integrally formed with the backplate 204. The locking member 508, the bracket 518 for receiving the release member 520, and the release member 520 are also formed separately.

In an embodiment, a portion of the backplate 204 is flexible. In an embodiment, a portion of the backplate 204 comprising a portion of the receiving part 500 is rigid. In an embodiment, substantially the entire backplate 204 is rigid.

In an embodiment, the bag is waterproof. An exemplary waterproof material for the flexible fabric case 202 is nylon/TPU coated fabric. Pieces of fabric may be high frequency or ultrasonically welded to provide a waterproof join.

In an embodiment, the bag 200 is opened and closed using a zip fastener 208. In an embodiment, the zip fastener 208 is a waterproof TPU zip fastener. In an embodiment, alternative fasteners are used, such as clips and seals.

The bag could be a carry bag as shown. Alternatively, the backplate 204 and/or receiving part 500 could be incorporated into or connected to a different type of bag, such as a backpack, a messenger bag, or a grocery bag. As another alternative, the backplate 204 and/or receiving part 500 could be incorporated into another type of accessory, such as a basket or a carrier.

Figure 15:
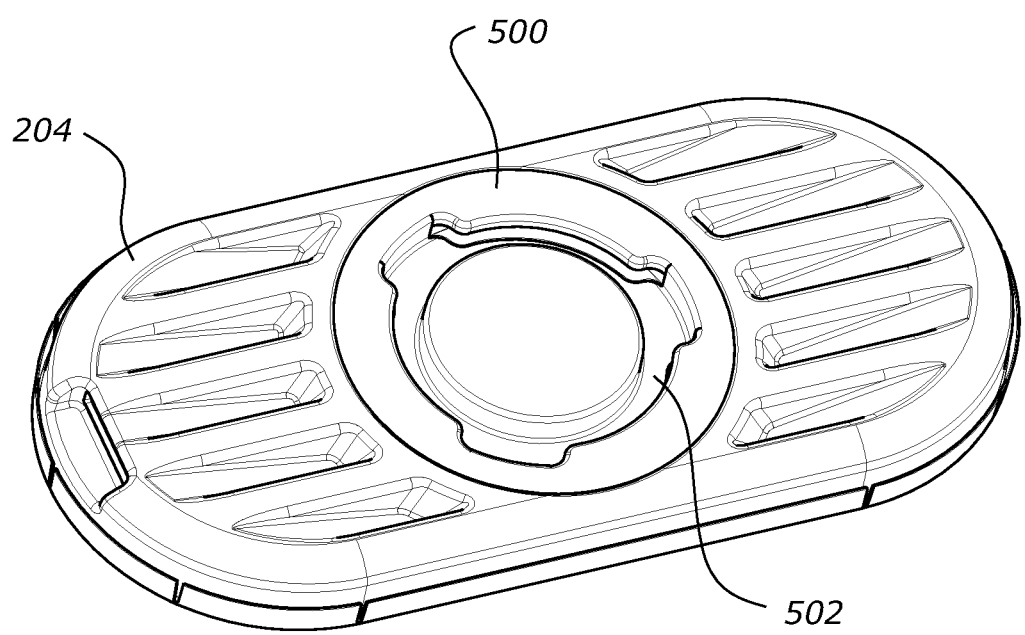
FIG. 15 shows a perspective view of the back of the backplate of the exemplary bag.
Figure 16A:
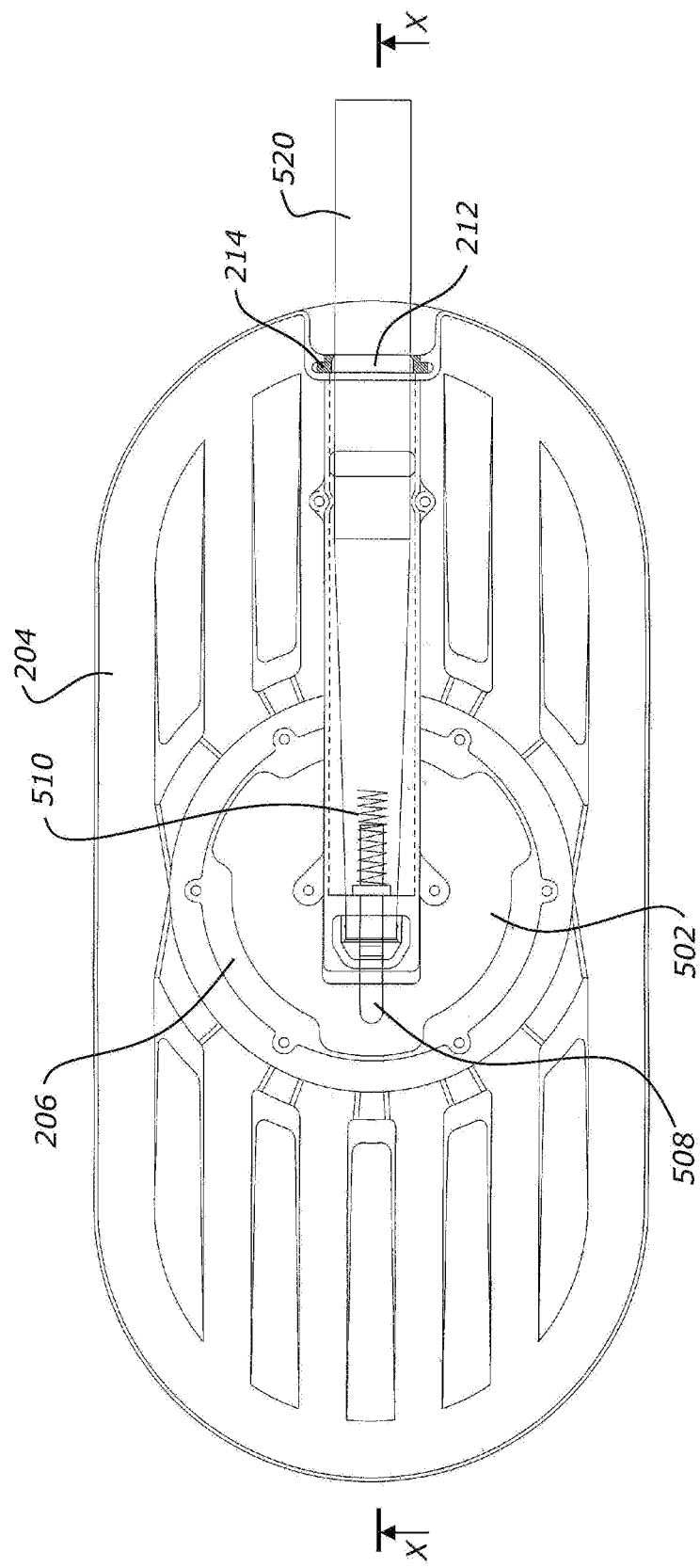
FIG. 16(A) shows a front view of the backplate of the exemplary bag and FIG. 16(B) shows a section view of the backplate viewed along line X-X.
Figure 16B:
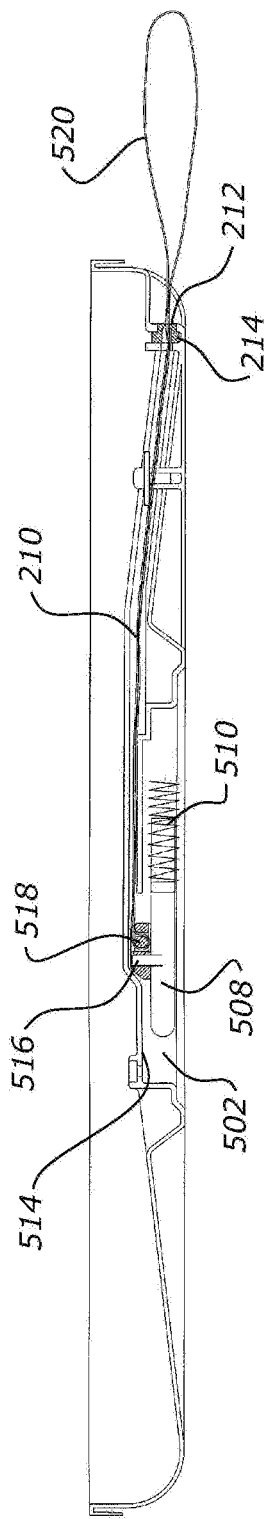

FIGS. 15 and 16(A)-(B) show the backplate 204 of the bag and the receiving part 500 in more detail. The backplate 204 has a channel 210 for receiving the release member 520. The release member 520 passes through a recess 212 such that an end of the release member 520 can be pulled by a user. In an embodiment, the recess 212 has a seal 214 to substantially prevent egress of water into the channel 210. The seal 214 may be formed from an elastomeric material.

Figures 17A, 17B, 17C:
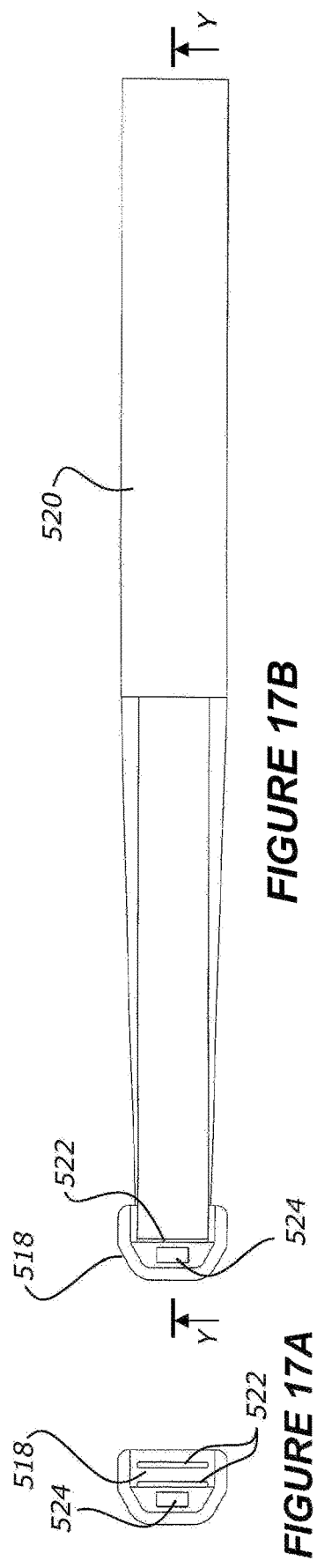
FIG. 17(A) shows an exemplary bracket for engaging with a pin and a release member.
FIG. 17(B) shows an exemplary release member engaged with the bracket.
FIG. 17(C) shows a section view of the bracket and release member viewed along line Y-Y.

FIGS. 17(A)-(C) show the release member 520 in more detail. The release member 520 loops through a slot 522 in the bracket 518. The bracket 518 has an aperture 524 for engaging with the transversely extending finger 516 of the locking member 508.

FIGS. 18(A)-(D) show an arrangement for a waterproof join 216 between the flexible fabric case 202 and the rigid backplate 204. FIG. 18(A) shows a section view of the backplate 204, with the join 216 between the fabric case 202 and the backplate 204 circled. FIGS. 18(B)-(D) show close up views of the method steps for making the join 216. The fabric case 202 is folded inside out and inserted in a slot 218 in the rear side of the backplate 204 as shown in FIG. 18(B). A seam 220 is then sewn through both sides of the slot 218 and the fabric 202 as shown in FIG. 18(C). The seam 220 pulls the sides of the slot 218 together to tightly clamp the fabric 202. The fabric case 202 is then folded over a side of the slot 218 into its final configuration as shown in FIG. 18(D). The join 216 is both watertight and visually appealing, as the seam 220 is not visible from the exterior of the accessory.

Figure 19:
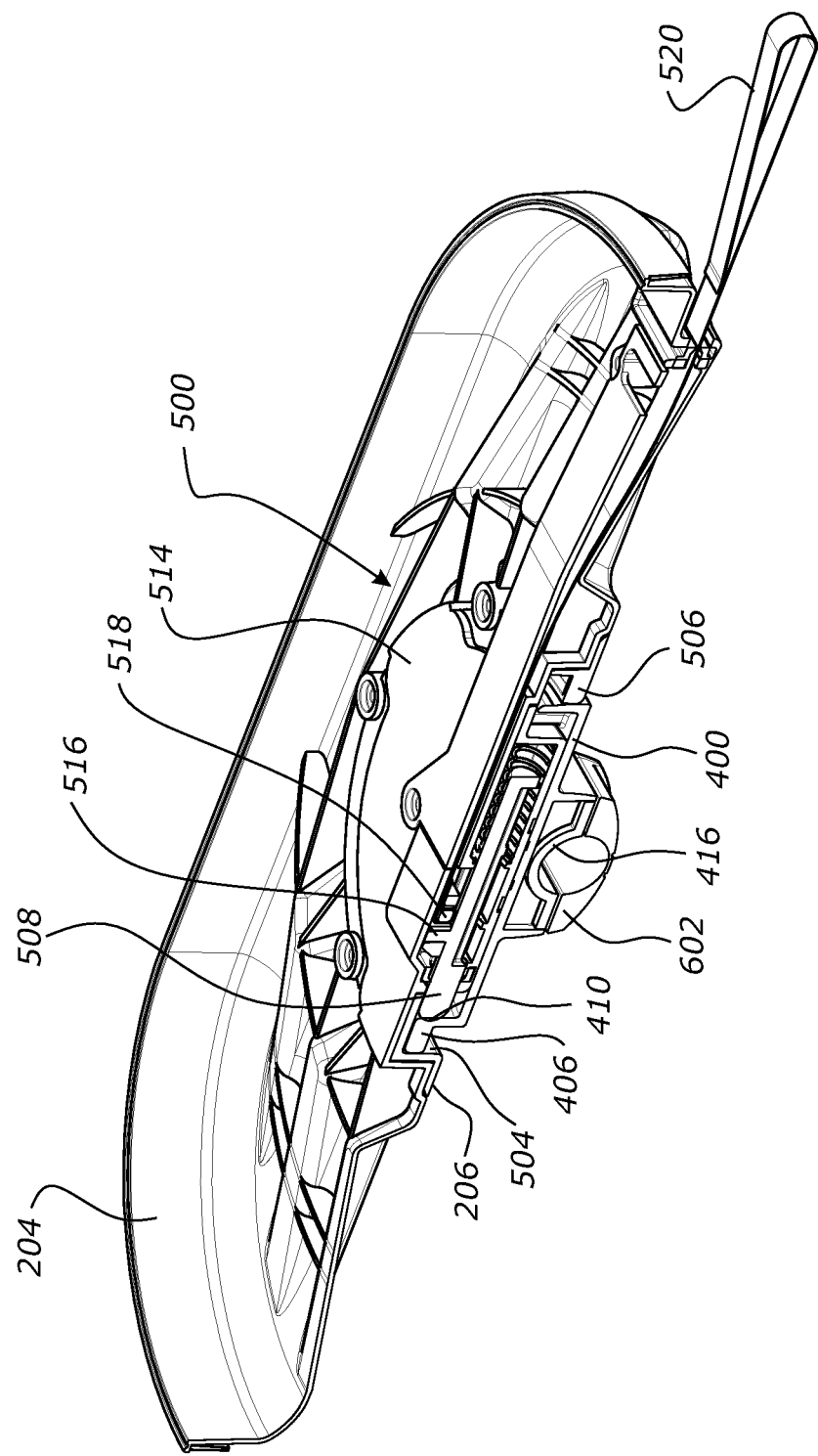
FIG. 19 shows a perspective section view of the backplate with the receiving part in a receiving/releasing position relative to the mounting part, viewed along line X-X (shown in FIG. 16(A))

FIG. 19 shows the backplate 204 of the bag 200 with the receiving part 400 in a receiving/releasing position relative to the mounting part 400. The lug 406 of the mounting part 400 is received by the slot 504 of the receiving part 500. The locking member 508 is received by the concave arcuate surface 406 of the mounting part 400.

Figure 20:
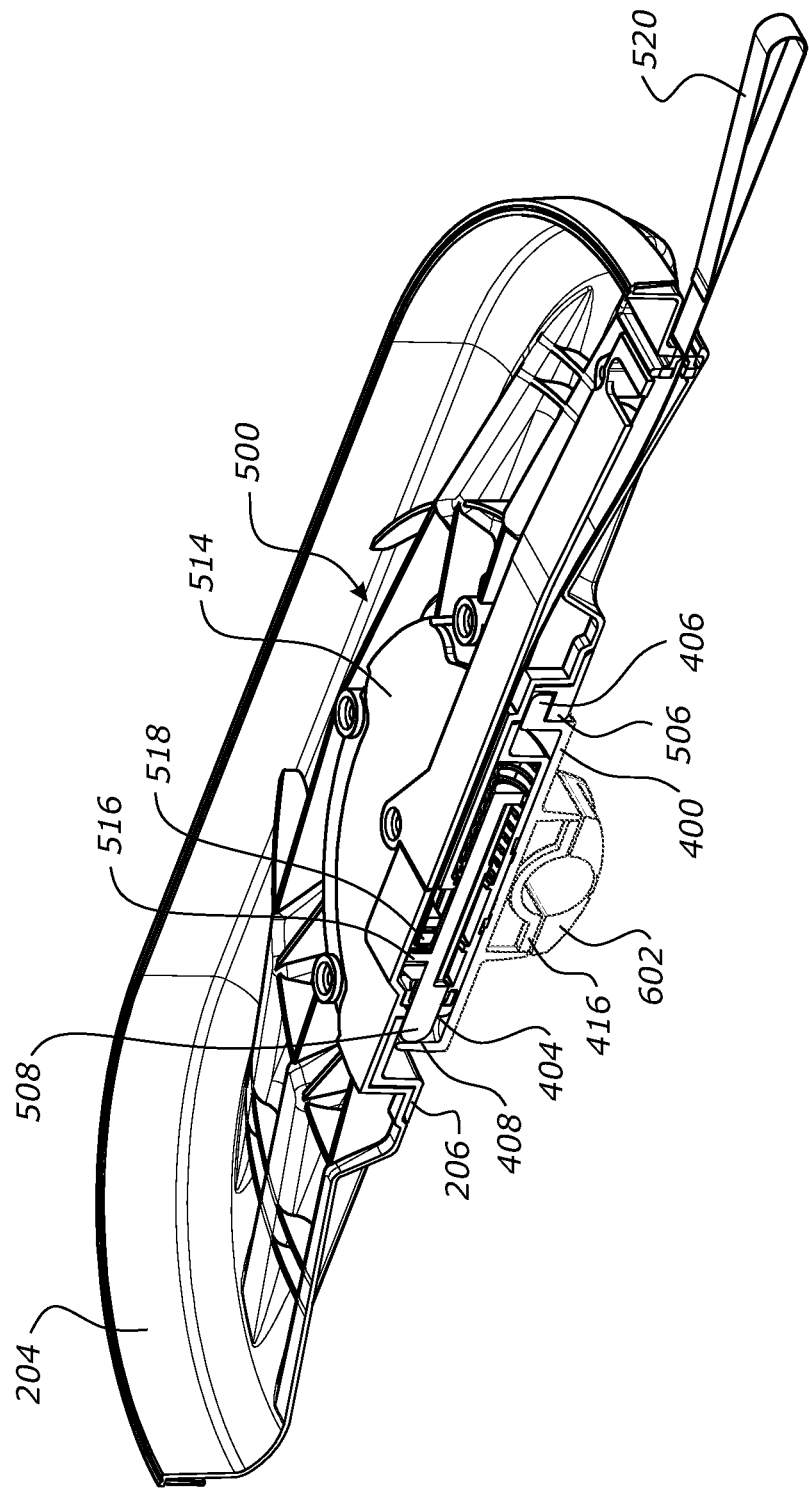
FIG. 20 shows a perspective section view of the backplate with the receiving part in a locked position relative to the mounting part, viewed along line X-X (shown in FIG. 16(A))

FIG. 20 shows the backplate 204 of the bag 200 with the mounting part 400 retained in the receiving part 500 after angularly moving the mounting part 400 relative to the receiving part 500. The lug 406 of the mounting part 400 is retained between the lip 506 of the receiving part 500 and the back portion 514 of the receiving part 500. The locking member 508 is engaged with a portion of one of the teeth 404.

Figure 21:
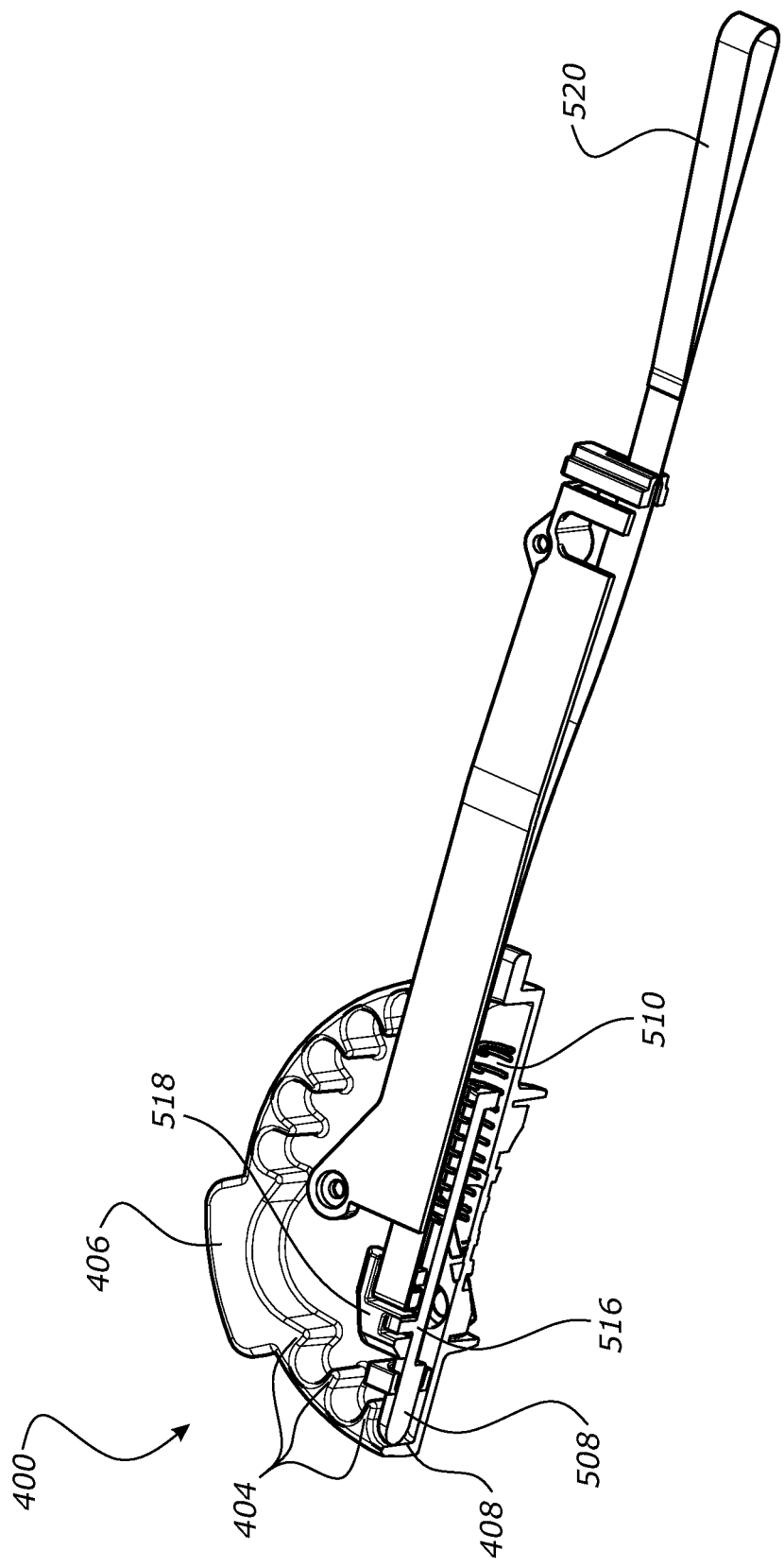
FIG. 21 shows a perspective section view of the backplate with some parts omitted, with the receiving part in a locked position relative to the mounting part, viewed along line X-X (shown in FIG. 16(A))

FIG. 21 shows the mounting part 400 retained in the receiving part 500 with some parts of the backplate 204 omitted for clarity.

FIG. 19 and FIG. 20 also show the optional clamp fitting 416 and clamp member 602, which are shown in more detail in FIGS. 23A-B. The clamp fitting 416 is received by the mounting bracket 412 of the mounting part 400. The clamp member 602 and the clamp fitting 416 have corresponding arcuate portions 604, 422 for receiving and retaining a substantially cylindrical member, such as a substantially cylindrical portion of a cycle component 302 and/or rack 800. Fasteners 606 extend through the clamp fitting 416 and the clamp member 602 to clamp the clamp fitting 416 and the clamp member 602 to the cylindrical member.

The clamp fitting 416 and the clamp member 602 are formed from a strong, rigid material such as a metallic material, or a composite material such as a carbon fibre reinforced polymer. A strong, rigid material is beneficially used so that the clamp fitting 416 and clamp member 602 achieve a strong grip on the substantially cylindrical member, and so that the clamping force does not cause deformation of the mounting part 400.

In the embodiment shown in FIGS. 14-20, the back portion 514 of the receiving part 500 is integrally formed with the backplate 204.

Figure 22:
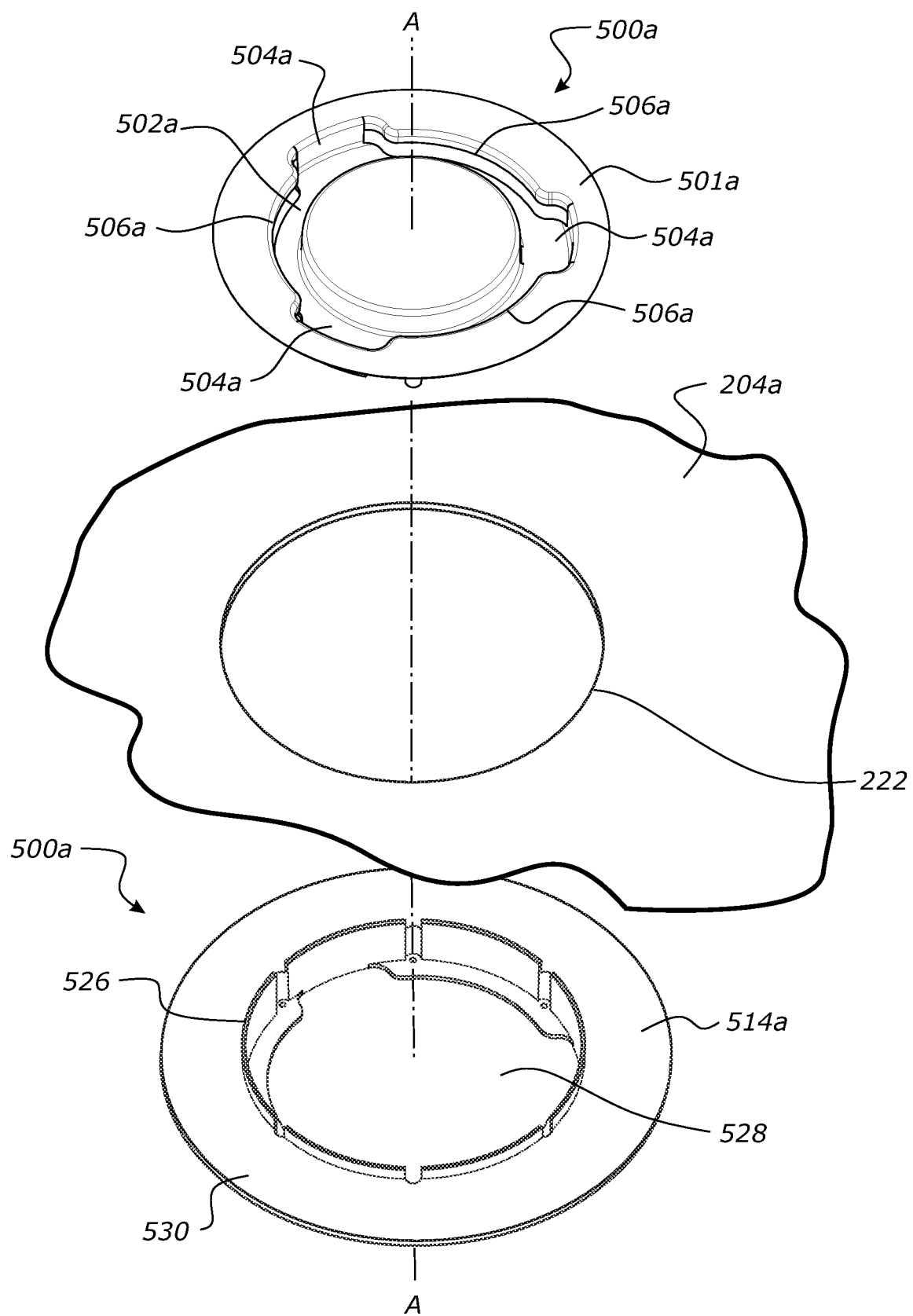
FIG. 22 shows an exploded perspective view of an alternative embodiment of a receiving part.

FIG. 22 shows an alternative embodiment of a receiving part 500a, where the back portion 514a is connected to the backplate 204a, instead of being integrally formed with the backplate. The receiving part 500a may be fitted to a range of different accessories, such as the accessories 200a, 200b, 200c and 200d shown in FIG. 3 and FIG. 4. It is envisaged that commercially available bags and other accessories may be readily adapted to have the receiving part 500a fitted to them. The receiving part 500a has the same features and functionality as the receiving part 500, except as described below. Like numbers indicate like parts, with the addition of 'a'.

The back portion 514a of the receiving part 500a is provided by a rigid adapter that is adapted to mate with a portion of the receiving part 500a, such as the main portion 501a of the receiving part 500a. The main portion 501a of the receiving part 500a is substantially the same as the main portion 501 described in relation to the receiving part 500.

The back portion 514a has a lip 526 that defines a recess 528 for receiving the recess 502a of the main portion 501a. A flange 530 extends radially outwardly from the lip 526.

The receiving part 500a is adapted to connect to a backplate 204a. The backplate 204a acts as stiffener member. The receiving part 500a is adapted to receive and retain the backplate 204a between the back portion 514a (the adapter) and the main portion 501a. The backplate 204a has an aperture 222. The aperture 222 has a diameter that is larger than the diameter of the lip 526, and smaller than the outer diameter of the main portion 501a of the receiving part 500a.

The backplate 204a comprises a substantially rigid material, for example, a foam material or a polymeric material. The backplate 204a may comprise a flat sheet of material. The backplate 204a may be sized and/or shaped to suit a specific accessory. The backplate 204a may be incorporated into the accessory during manufacture.

The receiving part 500a is fitted to the backplate 204a as follows. Firstly, the backplate 204a is secured to the flange 530 of the back portion 514a, for example by sewing, riveting or plastic welding. The main portion 501 is then secured to the back portion 514a, for example using fasteners inserted from the front of the back portion 514a, or using clips that are integrally formed with one or both of the main portion 501a and the back portion 514a.

FIGS. 24, 25(A)-(C), 26(A)-(B), 27 and 28(A)-(D) show an attachment device or adaptor 700 for use in a system 100 for mounting an accessory to a cycle. The attachment device has a body 702 defining a slot 724. A substantially linearly slideable block 720 is received in the slot 724. A retaining member 704 is connected to or connectable to the block 720. The retaining member 704 forms or is configured to form a loop extending at least partially around a cycle component 302. The attachment device 700 also has an adjustment mechanism 728 for changing the linear position of the block 720 relative to the body 702 to adjust the size of the loop to grip the cycle component 302.

In the embodiment shown, the adjustment mechanism 728 is a rotatably mounted threaded member that is threaded in a hole 726 in the block 720. Rotation of the rotatably mounted threaded member 728 about its axis causes movement of the block 720 along the axis of the rotatably mounted threaded member 728.

In alternative embodiments, the adjustment mechanism 728 could be any other suitable mechanism, such as a mechanism incorporating a ratchet.

Figure 24:
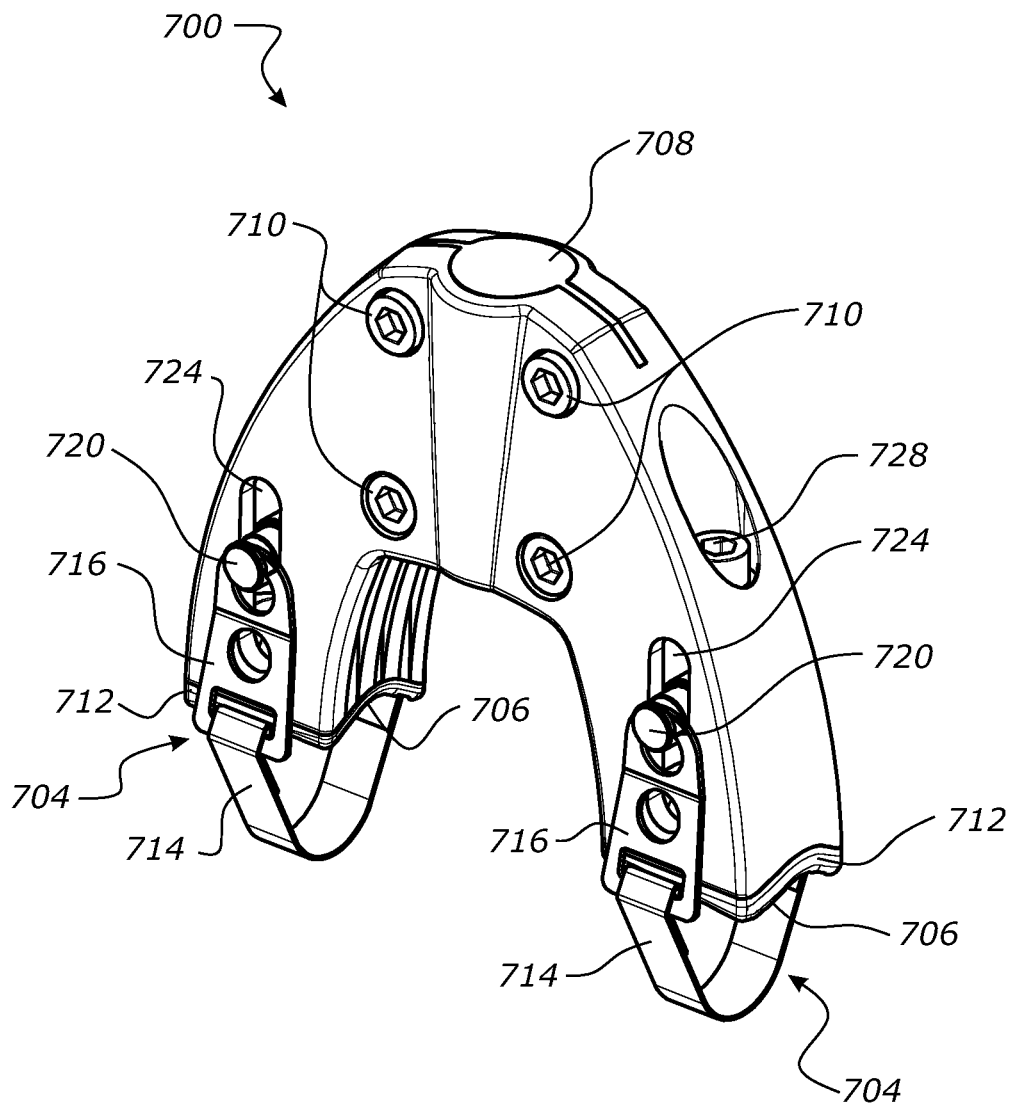
FIG. 24 shows a perspective view of an attachment device for mounting the mounting part to a cycle component.
Figure 25A:
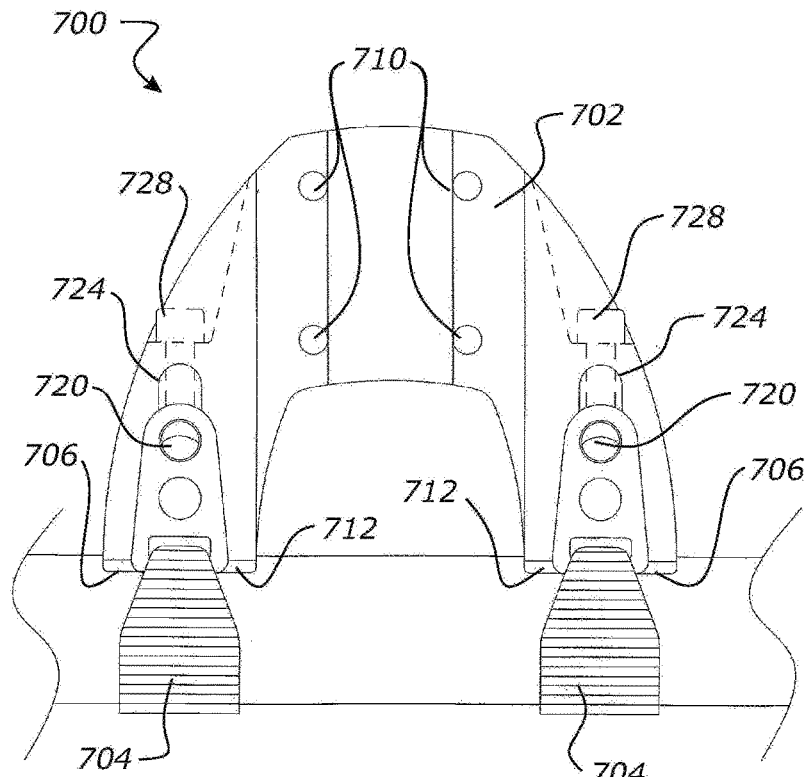
FIGS. 25(A)-(C) show detailed views of the attachment device.
Figure 25B:
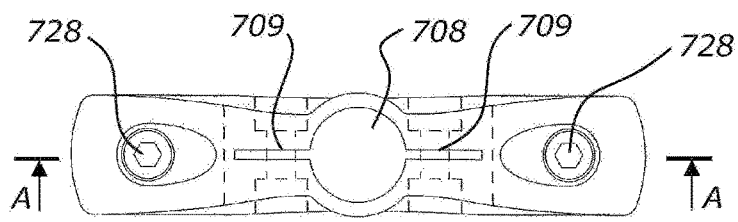
Figure 25C:
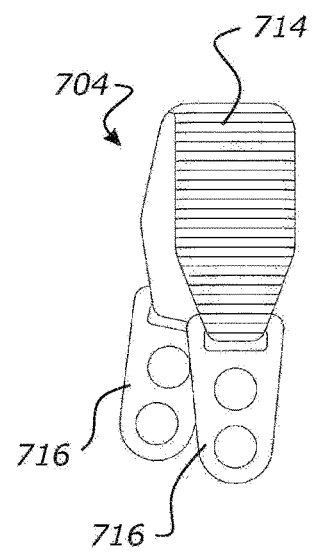

Referring to FIG. 24, the attachment device 700 has two spaced apart slots 724 in the body 702. The attachment device 700 has two linearly slideable blocks 720, one received in each slot 724. The attachment device 700 has two retaining members 704, one associated with each block 720. The attachment device has two adjustment mechanisms 728, one associated with each block 720.

The block(s) 720 could have any suitable shape, and will generally have portions that project from the body 702 to couple to the retaining members 704.

The body 702 has an arcuate surface 706 for engaging with a cycle component 302. In an embodiment, the arcuate surface has feet 712 formed from a soft and/or high friction material. In an embodiment, the feet 712 help to protect the cycle component 302 from being scratched by the body 702. In an embodiment, the feet 712 help to provide friction between the body 702 and the cycle component 302 so that the attachment device 700 is securely held against the cycle component 302.

The body 702 has an aperture 708 for receiving a member for indirectly mounting the mounting part 400 to the attachment device 700. In the embodiment shown, the aperture is adapted to receive a substantially cylindrical member. In alternative embodiments, the aperture is adapted to receive a member having any other suitable cross section, such as a rectangular, square, or oval cross section. At least one slot 709 extends from the aperture 708. In the embodiment shown, two slots 709 extend from the aperture 708.

The body 702 has holes 710 for receiving fasteners that align with the holes 420 in the mounting part 400 to enable the mounting part 400 to be directly mounted to the attachment device 700. The holes 710 pass through the slots 709, such that fasteners received in the holes 710 draw the sides of the slots 709 together to clamp the member in place in the aperture 708. In an embodiment, the body 702 has one of an aperture 708 for receiving a member or a plurality of holes 710 for receiving fasteners.

In an embodiment, a spacer having a substantially flat surface (not illustrated) is mounted to the mounting bracket 412 of the mounting part 400 to provide a suitable surface for mounting to the attachment device 700.

In the embodiment shown in FIG. 24, the retaining member 704 has a flexible portion 714 with rigid hooks 716 at either end. In an alternative embodiment, the entire retaining member 704 is rigid and the hooks 716 are integrally formed. The hooks 716 are adapted to engage with end portions 718 of a block 720. The block 720 is adapted to move within a slot 724 in the attachment device 700, with the end portions 718 of the block 720 extending out of the slot 724. The end portions 718 have recesses 719 for receiving the hooks 716. When the retaining member 704 grips the cycle component 302, the hooks 716 are tightly retained in the recesses 719 so that the hooks 716 cannot be disconnected from the block 720.

The block 720 has a threaded hole 726 for receiving a threaded fastener 728. The threaded fastener 728 is received by a hole 726 in the body 702 and engages with the block 720. Turning the fastener 728 in a first direction moves the block 720 in a direction towards the arcuate surface 706 of the body 702. Turning the fastener 728 in a second direction moves the block 720 in a direction away from the arcuate surface 706 of the body 702.

In the embodiment shown, the hooks 716 of the retaining member 704 have two apertures 722 spaced apart at different distances from the ends of the flexible portion 714 of the retaining member 704. Hooking the hooks 716 onto the block 720 using different combinations of apertures 722 enables the operative length of the retaining member 704 to be adjusted relative to the body 702, to accommodate different frame sizes. In alternative embodiments, the hooks 716 may have different numbers of apertures 722. For example, one, three, or four apertures 722.

In an embodiment, the hooks 716 of the retaining member 704 can rotate relative to the block 720. This enables the retaining member 704 to align with the geometry of non-uniformly shaped cycle components, such as a cycle component having a tapered cross-section or a bent portion. This arrangement may provide a more secure connection to components having a non-uniform cross-section compared with known methods of connecting accessories to cycle components. The hooks 716 can also be rotated so that the retaining member 704 is positioned to avoid or accommodate variations in the geometry of cycle components, for example, lugs protruding from the rear stays of a bicycle frame.

Figure 26A:
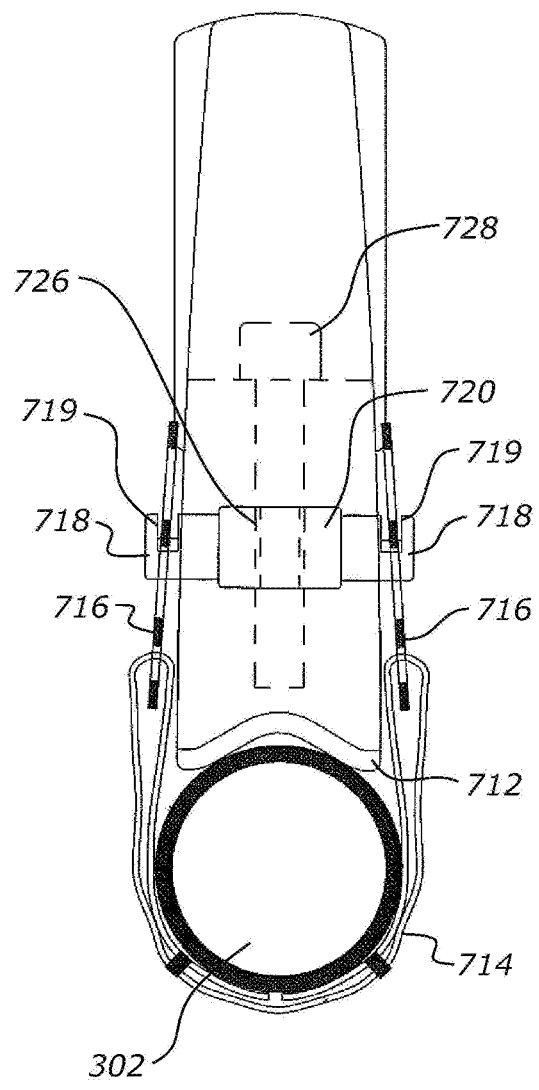
FIGS. 26(A) and (B) show the attachment device installed on differently shaped portions of cycle components.
Figure 26B:
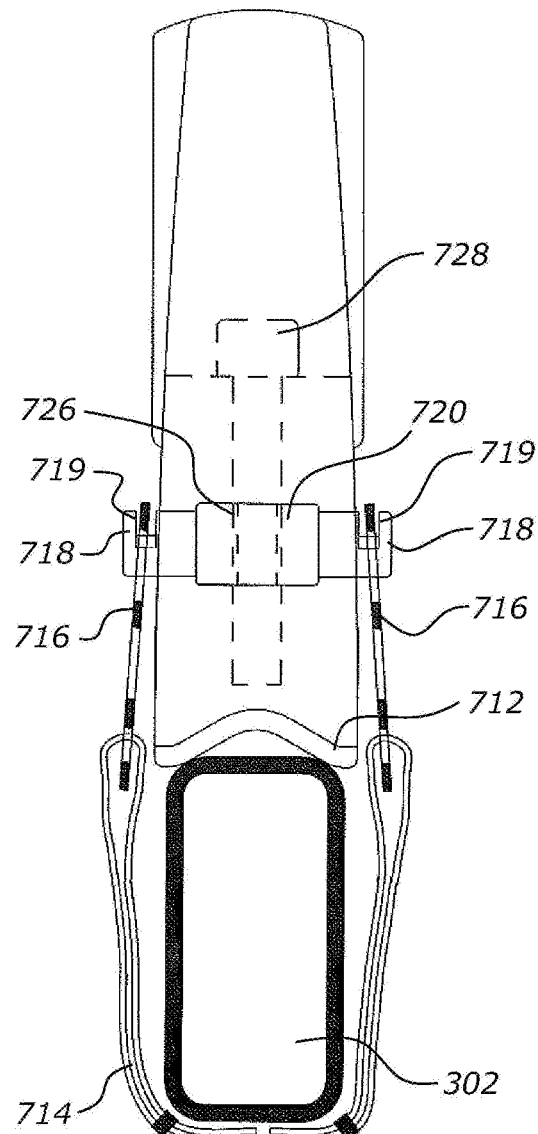
Figure 27:
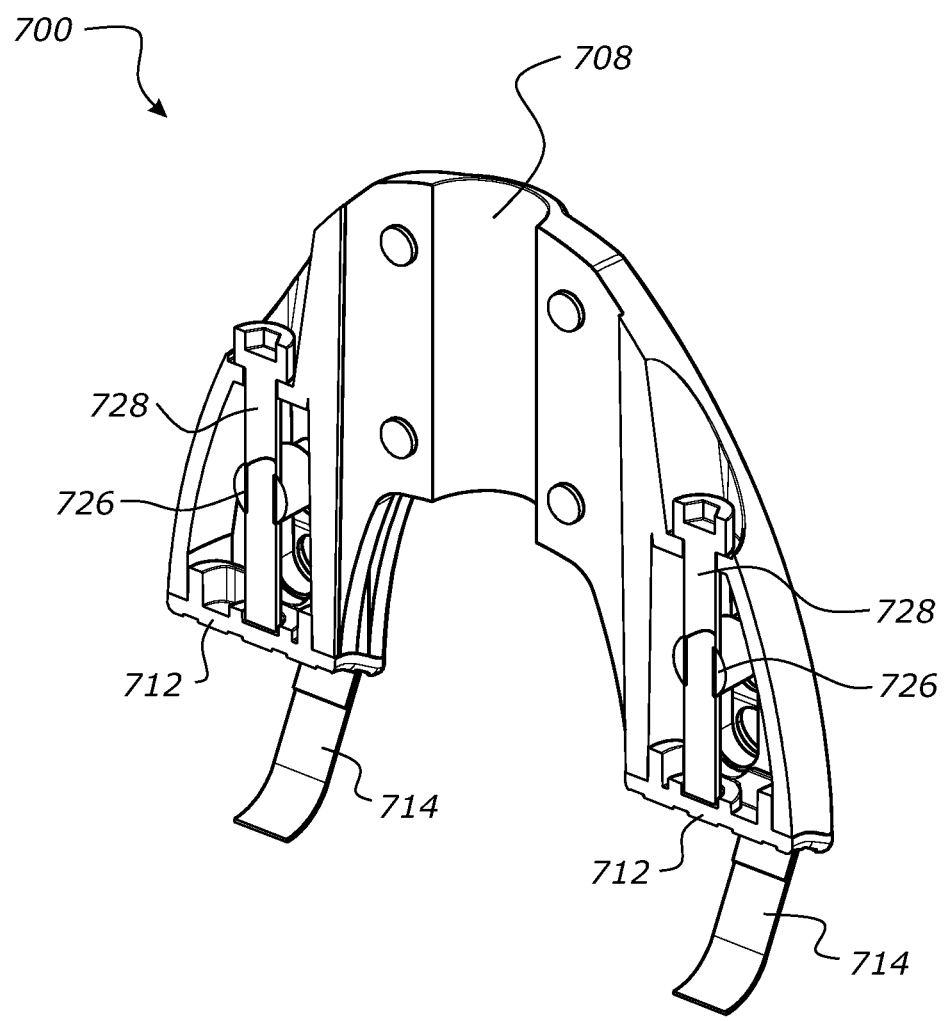
FIG. 27 shows a perspective section view of the attachment device, viewed along line A-A (shown in FIG. 25(B)

FIG. 26(A) shows the retaining member 704 hooked onto the block 720 through the apertures 722 that are closest to the ends of the flexible portion 714 of retaining member 704 to accommodate a cylindrical portion of a cycle component 302. FIG. 26(B) shows the retaining member 704 hooked onto the block 720 through the apertures 722 that are furthest from the ends of the flexible portion 714 of the retaining member 704 to accommodate a square portion of a cycle component 302 that has a larger perimeter than the cylindrical portion shown in FIG. 26(A).

Figure 29:
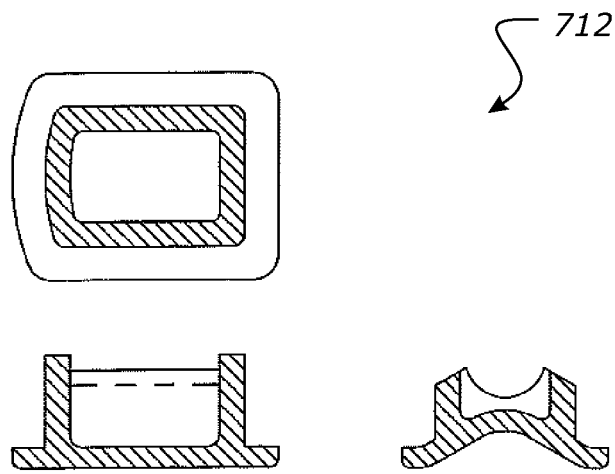
FIG. 29 shows top, front and side views of an attachment device foot.
Figure 30:
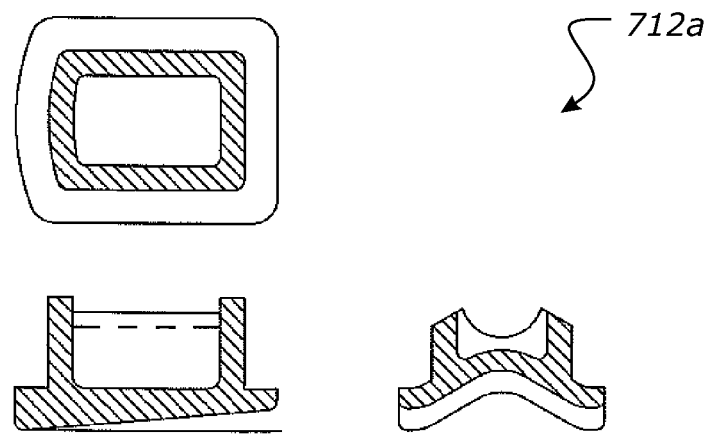
FIG. 30 shows an optional variation for the attachment device foot.
Figure 31D:
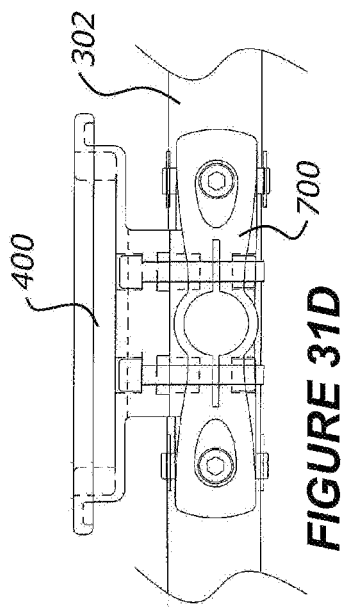
FIGS. 31(A)-(D) show detail of the attachment device mounted to a cylindrical cycle component with the mounting part directly mounted to the attachment device.
Figure 31C:
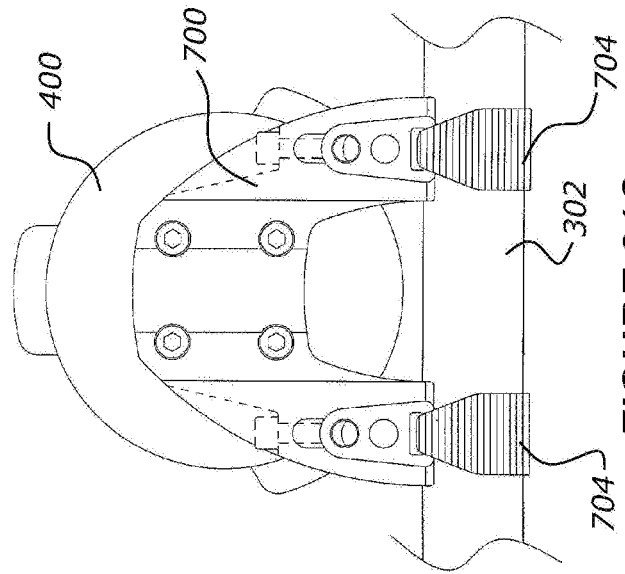
Figure 31B:
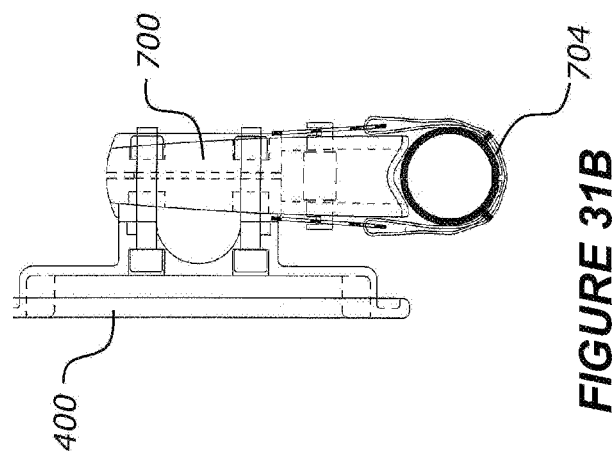
Figure 31A:
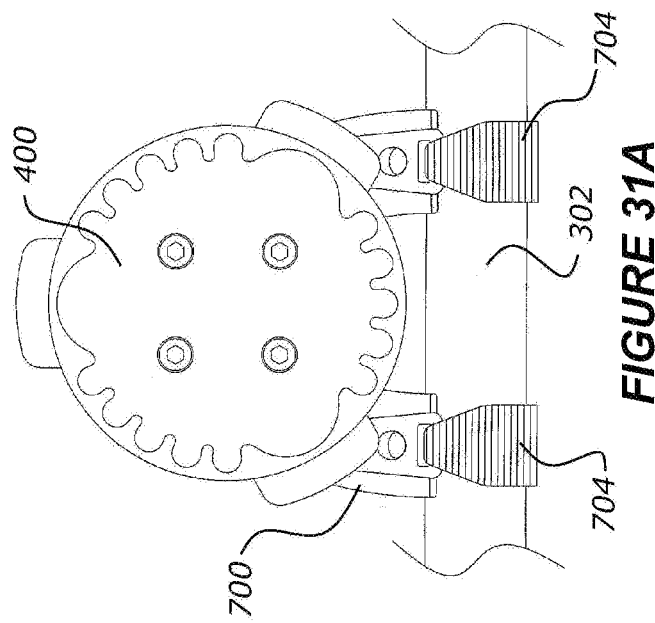

FIG. 29 schematically shows top, front and side views of one of the attachment device feet 712. FIG. 30 shows an optional variation for the attachment device feet 712a. This variation is adapted for use on an angled surface. Other variations will be apparent to a person skilled in the art. In an embodiment, the feet 712 are interchangeable and may be customised depending on the geometry of the portion of the cycle component 302 that the attachment device 700 is attached to. For example, feet 712a that are wider at one end and narrower at another end may be used when the system is installed on a cycle component with a bent portion, such as the handlebars of a bicycle.

FIGS. 31(A)-(D) show detail of the attachment device 700 mounted to a cylindrical cycle component 302, with the mounting part 400 directly mounted to the attachment device 700.

Figure 32:
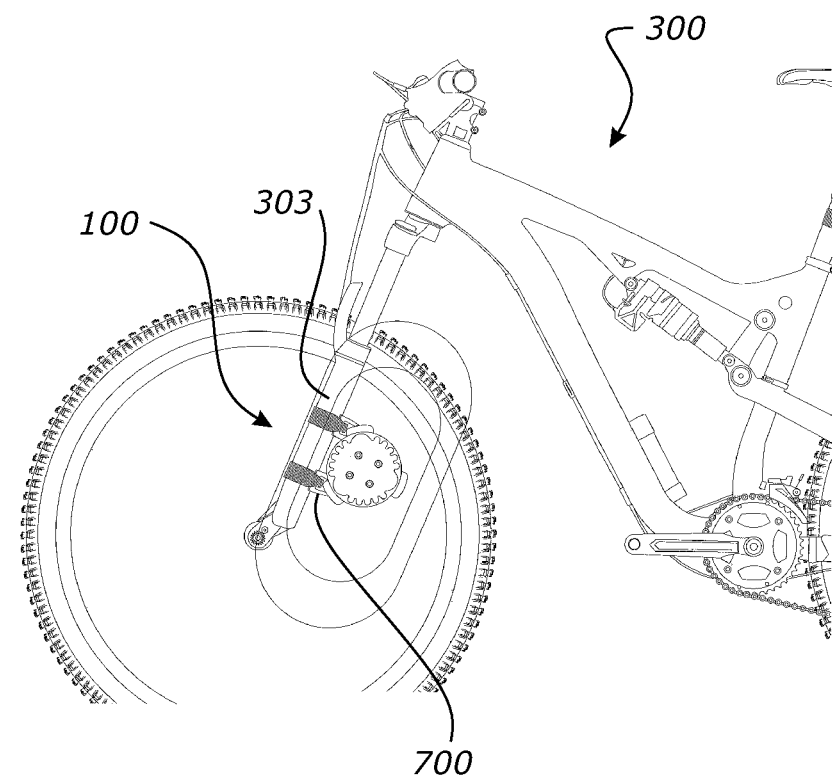
FIG. 32 shows the system mounted to a front fork of a bicycle.
Figure 33:
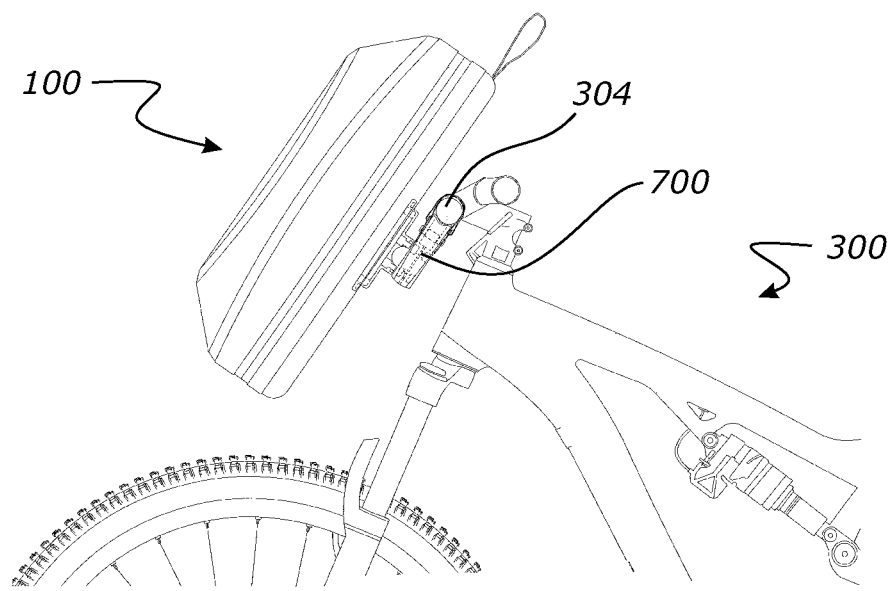
FIG. 33 shows the system mounted to handlebars of a bicycle.

FIG. 32 and FIG. 33 show exemplary locations for the system 100 comprising the mounting part 400 directly mounted to the attachment device 700. FIG. 32 shows the system 100 mounted to a front fork 303 of a bicycle 300. FIG. 33 shows the system 100 mounted to handlebars 304 of a bicycle 300.

In an embodiment, a rack 800 having a substantially cylindrical member 802 is mounted in one or more apertures 708 of one or more attachment devices 700. One or more mounting parts 400 are mounted to the rack 800 via the clamp 600 described above. The mounting part 400 may be mounted at various locations on the rack 800 using the clamp 600, depending on the preferences of the user.

The rack 800 is made from a suitably strong, rigid material such as a metallic material. In an embodiment, the rack 800 is formed from aluminium tube.

Figure 34:
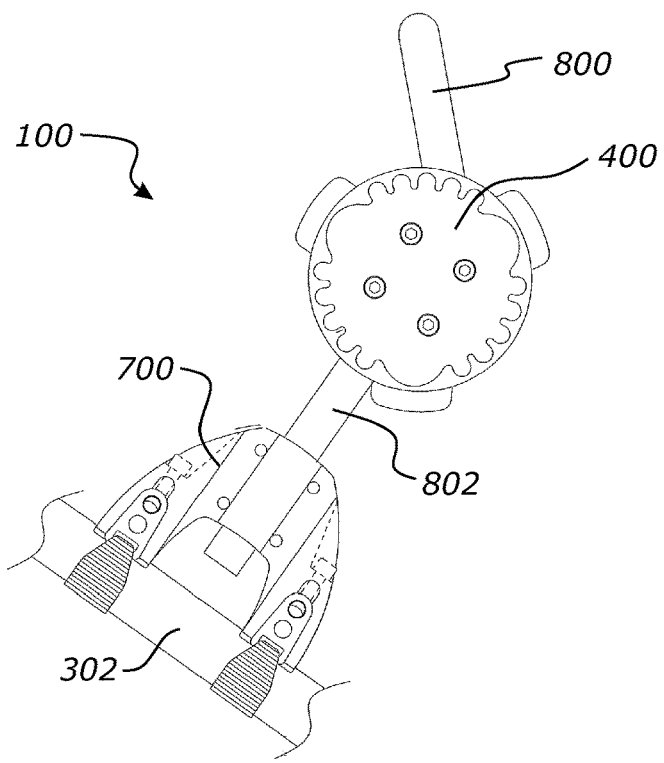
FIG. 34 shows a side view of an exemplary rack that is mounted in two attachment devices.
Figure 35:
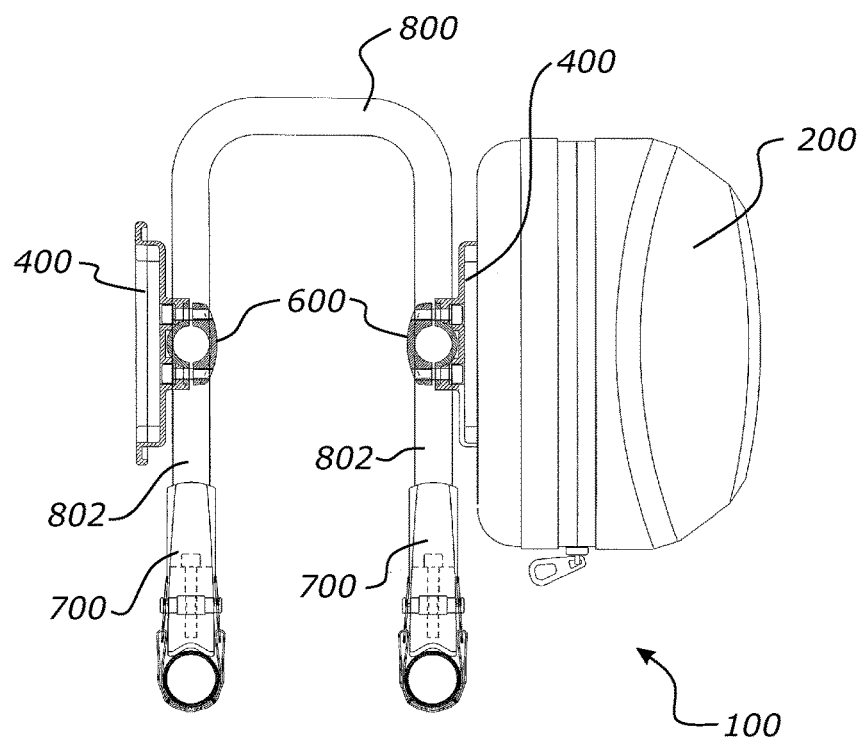
FIG. 35 shows a front view of the rack of FIG. 34.

FIG. 34 and FIG. 35 show an exemplary rack 800 that is mounted in two attachment devices 700. Such a rack 800 is suitable for mounting on the rear stays, such that the rack 800 passes over the back wheel as shown in FIG. 1 and FIG. 2.

Figure 36:
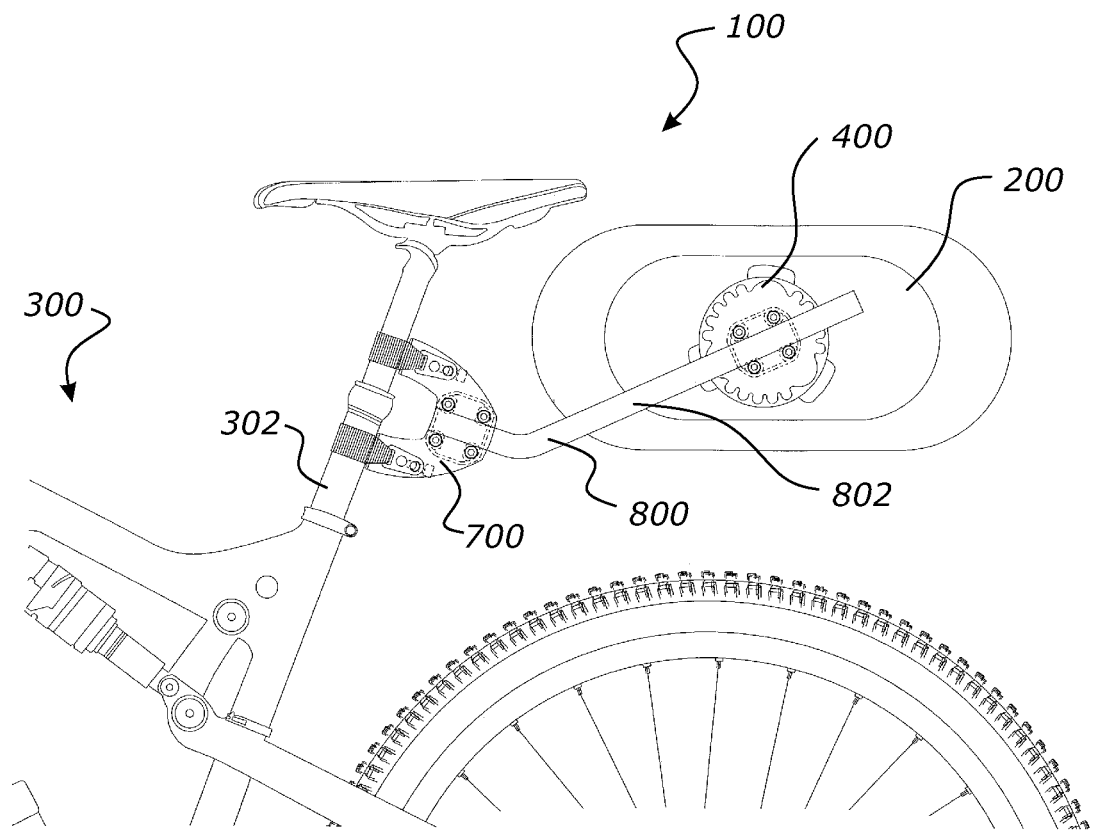
FIG. 36 shows an exemplary rack that is mounted in one attachment device.

FIG. 36 shows an exemplary rack 800 that is mounted in one attachment device 700. Such a rack 800 is suitable for mounting on the seat post, such that the rack 800 extends rearwardly of the seat post.

FIGS. 37(A)-(C) show an alternative attachment device or adaptor 700a specifically arranged for mounting to the handlebars 304 of a cycle 300. The attachment device 700a comprises two apertures 708a for receiving a rack 800a. The rack 800a is fastened in the apertures 708a using any suitable means. The rack 800a may be permanently fastened in the apertures 708a. The mounting part 400 is mounted to the rack 800a.

The alternative attachment device 700a is mounted to the handlebars 304 of a cycle 300 using two retaining members 704a that are connected to or connectable to linearly slideable blocks 720a in a manner that is substantially the same as that described above in relation to the attachment device 700. The alternative attachment device 700a is shown without the retaining member 704a on one side for clarity. In the embodiment shown, the retaining member 704a is rigid. In alternative embodiments, a portion of the retaining member 704a is flexible.

The attachment device 700a also has an arm 730 that rests against the handlebar stem 306 to provide additional support to the system 100.

Figure 38:
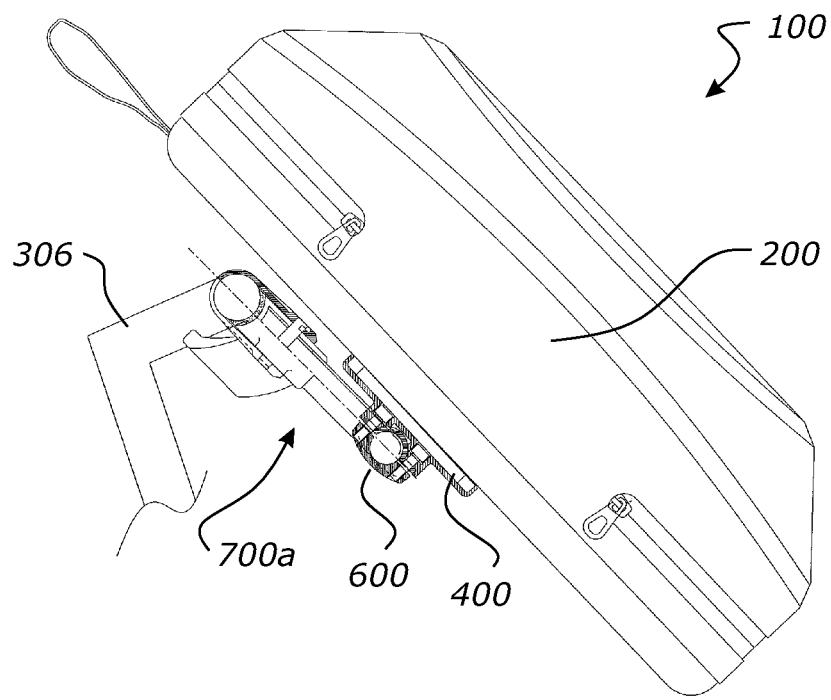
FIG. 38 shows the bag arranged at a first orientation relative to the alternative attachment device shown in FIGS. 37A-C.
Figure 39:
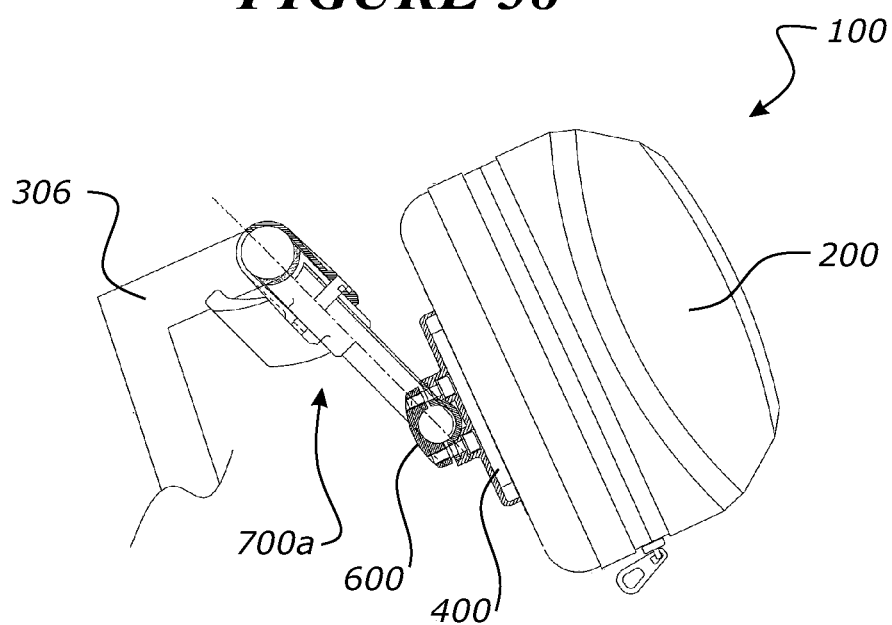
FIG. 39 shows the bag arranged at a second orientation relative to the alternative attachment device shown in FIGS. 37A-C.

FIG. 38 and FIG. 39 show the bag 200 arranged at two different orientations relative to the alternative attachment device 700a. The bag 200 is also shown mounted to the alternative attachment device 700a in FIG. 1 and FIG. 2.

Except where stated otherwise, the parts of the system 100 described above may be formed from a suitable rigid, lightweight material such as a polymeric material. The polymeric material may include glass fibres. Exemplary materials are polypropylene with about 15% glass fibres and polyamide with about 30% glass fibres.

The system 100 for mounting an accessory 200 to a cycle 300 described above may enable loads to be carried on cycles for a wide range of applications, including for leisure, touring on and off road, commuting and work purposes. The system 100 may also enable loads to be carried on different types and styles of cycles including bicycles, tricycles, road bikes, mountain bikes, urban bikes, cross bikes, e-bikes, e-tricycles, motorcycles and four wheeled 'quad' bikes.

The system 100 may provide a modular system 100 that allows waterproof bags of various capacities to be interchangeably mounted in a range of positions on cycles, offering versatility to a user. For example, the bag may have a volume of about 9 litres, about 11 litres, or about 14 litres.

The bags may be lightweight, robust and waterproof. The bags may be adapted to contain a range of items, including compact tents, bed rolls, sleeping bags, cookers, food items and clothing that may be required by a user, for example while touring. The bags may be adapted to carry work related items such as laptops, tablets, books, food and personal items that may be required by a user, for example for urban use such as commuting with work.

The mounting part 400 may be securely and releasably mounted to a cycle component 302, including the forks, handle bars and rear stays, or to a rack 800 operatively connected to a portion of the cycle component 302. The bags may be quickly mounted to the mounting part 400 via the receiving part 500 with a single bayonet-style locking member that engages with the mounting part 400. The bag can be positioned throughout a 360 degree range to match the cycle geometry as required. The bags may be quickly disconnected from the mounting part 400 without the use of tools.

In addition to the exemplary bags, the system 100 may be used to mount other cycle accessories to a cycle 300, including backpacks, baskets, messenger bags, grocery bags and carriers. Other accessories may have receiving parts 500 operatively connected or integrally formed.

Preferred embodiments of the invention have been described by way of example only and modifications may be made thereto without departing from the scope of the invention.

The invention claimed is:

1. An attachment device for use in a system for mounting an accessory to a cycle, the attachment device comprising:
    a body defining a slot and having a surface for engaging with a cycle component;
    a substantially linearly slideable block received in the slot, a portion of the block extending out of the slot;
    a retaining member connected to or connectable to the block, the retaining member forming or configured to form a loop extending at least partially around a cycle component, wherein an end of the retaining member is engageable with the portion of the block that extends out of the slot; and
    an adjustment mechanism for changing the linear position of the block relative to the body to adjust the size of the loop to grip the cycle component;
    wherein the adjustment mechanism comprises a rotatably threaded member and rotation of the rotatably threaded member about its axis causes movement of the block along the axis of the rotatably threaded member, wherein turning the rotatably threaded member in a first direction moves the block in a direction towards the surface for engaging with a cycle component to increase a size of the loop, and wherein turning the rotatably threaded member in a second direction moves the block in a direction away from the surface for engaging with a cycle component to reduce the size of the loop.

2. The attachment device according to claim 1, wherein the rotatably threaded member comprises a head that is accessible from an opposite side of the body from the surface for engaging with a cycle component.

3. The attachment device according to claim 1, wherein the surface for engaging with a cycle component is an arcuate surface.

4. The attachment device according to claim 1, wherein the retaining member has a flexible portion.

5. The attachment device according to claim 4, wherein the end of the retaining member comprises a rigid member.

6. The attachment device according to claim 5, wherein the portion of the block comprises a recess for receiving the rigid member.

7. The attachment device according to claim 4, wherein an opposite end of the retaining member is engageable with an opposite portion of the block that extends out of the slot.

8. The attachment device according to claim 7, wherein the opposite end of the retaining member comprises a rigid member.

9. The attachment device according to claim 7, wherein the opposite portion of the block comprise a recess for receiving the rigid member.

10. The attachment device according to claim 1, further comprising:
   two spaced apart slots in the body;
   two of said linearly slideable blocks, one received in each slot;
   two of said retaining members, one associated with each block; and
   two of said adjustment mechanisms, one associated with each block.

11. The attachment device according to claim 1, further comprising an aperture for receiving a substantially cylindrical member.

12. The attachment device according to claim 11, wherein the substantially cylindrical member is a portion of a rack.

13. The combination of the attachment device according to claim 12 and the rack comprising the substantially cylindrical member, wherein the substantially cylindrical member is receivable in or received in the aperture.

14. The combination according to claim 13, further comprising another attachment device, wherein said another attachment device comprises:
   a body defining a slot and having a surface for engaging with a or the cycle component;
   a substantially linearly slideable block received in the slot, a portion of the block extending out of the slot;
   a retaining member connected to or connectable to the block, the retaining member forming or configured to form a loop extending at least partially around the cycle component, wherein an end of the retaining member is engageable with the portion of the block that extends out of the slot; and
   an adjustment mechanism for changing the linear position of the block relative to the body to adjust the size of the loop to grip the cycle component;
   wherein the adjustment mechanism comprises a rotatably threaded member and rotation of the rotatably threaded member about its axis causes movement of the block along the axis of the rotatably threaded member, wherein turning the rotatably threaded member in a first direction moves the block in a direction towards the surface for engaging with a cycle component to reduce a size of the loop, and wherein turning the rotatably threaded member in a second direction moves the block in a direction away from the surface for engaging with a cycle component to reduce the size of the loop; and
   an aperture for receipt of or receiving a or the substantially cylindrical member.

\* \* \* \* \*